US012680820B2

(12) United States Patent (10) Patent No.: US 12,680,820 B2
Werber et al. (45) Date of Patent: Jul. 14, 2026

---

(54) GENERATING AN INDICATION OF WHERE A MOBILE UNIT CAN MOVE TO

(71) Applicant: TomTom Navigation B.V., Amsterdam (NL)

(72) Inventors: Jürgen Werber, Amsterdam (NL); Tobias Ludwig, Amsterdam (NL); Kai Höwelmeyer, Amsterdam (NL)

(73) Assignee: TomTom Navigation B.V., Amsterdam (NL)

( * ) Notice: Subject to any disclaimer, the term of this patent is extended or adjusted under 35 U.S.C. 154(b) by 142 days.

(21) Appl. No.: 18/495,510

(22) Filed: Oct. 26, 2023

(65) Prior Publication Data

US 2024/0151546 A1 May 9, 2024

(30) Foreign Application Priority Data

Oct. 28, 2022 (EP) .................................... 22204399

(51) Int. Cl.
G01C 21/34 (2006.01)

(52) U.S. Cl.
CPC ..... G01C 21/3469 (2013.01); G01C 21/3461 (2013.01)

(58) Field of Classification Search
None
See application file for complete search history.

(56) References Cited

U.S. PATENT DOCUMENTS

2013/0282272 A1 10/2013 Kluge et al.
2014/0019041 A1 1/2014 Kluge et al.
(Continued)

FOREIGN PATENT DOCUMENTS

GB       2581521 A    8/2020
WO    WO-2022163366 A1 *  8/2022  ........... G01C 21/367

OTHER PUBLICATIONS

WO2022163366 English Translation (Year: 2022).*
Extended European Search Report; Application No. 22204399.4; Completed: Apr. 4, 2023; Issued: Apr. 14, 2023; 9 Pages.

*Primary Examiner* — Anne Marie Antonucci
*Assistant Examiner* — Nicholas Patrick Langhorn
(74) *Attorney, Agent, or Firm* — Whitmyer IP Group LLC

(57) ABSTRACT

A method of generating an indication of where, within a geographical region, a mobile unit can move to from a specified origin in the geographical region using a network of navigable elements in the geographical region and in accordance with a total movement budget specified for the mobile unit, the method including: for each sub-region of a set of one or more sub-regions of the geographical region, associating one or more corresponding utilization amounts with said sub-region; identifying an initial navigable element that corresponds to the origin; performing a sequence of steps, wherein each step includes: using an identification function to try to identify an additional navigable element, wherein the additional navigable element is a neighbour of an already-identified navigable element and can be reached by the mobile unit from the origin in accordance with the total movement budget; and in response to the identification function identifying an additional navigable element of at least one sub-region, performing an update for at least one utilization amount corresponding to a sub-region for the identified additional navigable element; wherein, for each sub-region of the set of one or more sub-regions, the identification function is arranged to ignore at least one of the unidentified navigable elements of that sub-region if a group including the one or more utilization amounts that correspond to that sub-region and that have passed a corresponding predetermined threshold meets an ignore criterion; and generating the indication of where the mobile unit can
(Continued)

move to according to the navigable elements that have been identified.

20 Claims, 10 Drawing Sheets

(56)                    References Cited

U.S. PATENT DOCUMENTS

2014/0278038  A1       9/2014   Stankoulov
2015/0149078  A1*      5/2015   Profous .............. G01C 21/3446
                                                                701/410
2016/0153796  A1*      6/2016   Stankoulov ........ G01C 21/3469
                                                                701/123

* cited by examiner

300

302 — Obtain indication of origin and total movement budget (and, possibly, other budget-related data)

304 — Identify an initial navigable element

306 — Using identification function to try to identify an additional navigable element 308 — Found? —Yes No 310 — Generate an indication of where the mobile unit can move to 312 — Provide an output based on the generated indication

400

400

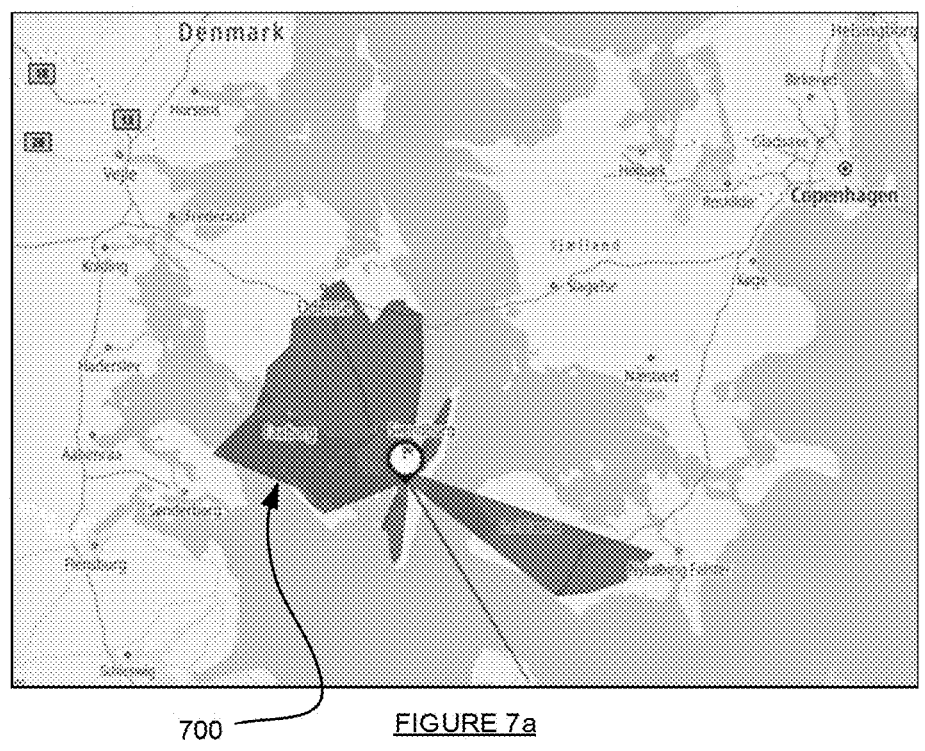
700     FIGURE 7a
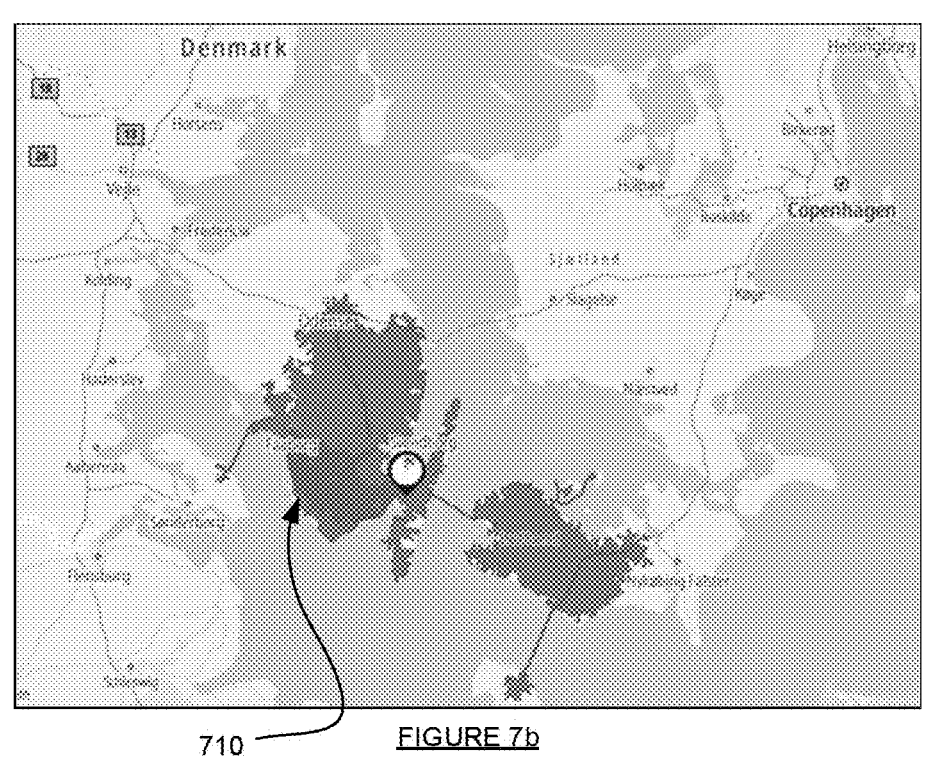
710     FIGURE 7b

750

760

GENERATING AN INDICATION OF WHERE A MOBILE UNIT CAN MOVE TO

TECHNICAL FIELD

The present invention relates to methods of generating an indication of where, within a geographical region, a mobile unit can move to from a specified origin in the geographical region using a network of navigable elements in the geographical region and in accordance with a total movement budget specified for the mobile unit. The present invention also relates to systems and computer programs for carrying out such methods.

BACKGROUND

Vehicles (such as cars, motorbikes, lorries, etc.) usually travel along "navigable elements" of a network of navigable elements. For example, the "navigable element" may be a road, or a portion/section of a road, that forms part of a road network. Of course, other types of "navigable element" exist, such as: routes, or parts thereof, taken by ferries or trains; paths, or parts thereof, for pedestrians; cycle paths, or parts thereof; etc. Thus, a navigable element may be viewed as a part of a transport network along which travel may be conducted by a mobile unit (where the mobile unit could be, for example, a vehicle, a person, etc.).

Devices and software for navigation assistance (or navigation planning or navigation control) for a mobile unit are well-known. For example: vehicles may have built-in navigation systems for providing route information/guidance; autonomous vehicles may have built-in navigation systems for controlling the movement of the vehicle; portable devices (e.g. sat-nav devices) for use within vehicles are well-known; navigation software applications can be executed on devices such as smartphones; etc.

With the ever-increasing complexity of networks of navigable elements (e.g. road networks), and with the ever-increasing amount of data stored in relation to such networks (e.g. more detailed geometry at higher resolutions, etc.), it is becoming increasingly important to be able to perform navigation processing on such data efficiently and effectively so as to provide such navigation assistance. Clients that require results of navigation processing do not, and sometimes cannot, tolerate unacceptable delays in receiving those results.

SUMMARY

One particular aspect of navigation assistance (or navigation planning or navigation control) for a mobile unit involves being able to accurately determine where, within a geographical region, a mobile unit can move to from a specified origin in the geographical region (such as a current location of the mobile unit or a known future location for the mobile unit) using the network of navigable elements and in accordance with a total movement budget specified for the mobile unit—for example, determining where a vehicle can move to based on a current amount of fuel or energy (e.g. battery level) available for use by that vehicle. Being able to determine this quickly and with a high degree of accuracy can be extremely useful. For example, an in-vehicle computer for a vehicle could, during a journey, periodically determine where the vehicle can move to from its current location (for example, based on the current amount of fuel/charge available for movement, the current fuel/charge consumption rate/profile by the vehicle, etc.)—this can assist the driver to know whether or not they can reach their planned destination and how their driving style is affecting where they can reach; likewise, this can assist the in-vehicle computer to determine whether a change to a currently planned route needs to be implemented, for example so that a stop can be made at a fuel/recharging-station in order to still be able to reach a planned destination; additionally or alternatively this can assist the in-vehicle computer to select a fuel/recharging-station that can be reached. Other similar scenarios exist.

Therefore, according to a first aspect of the invention, there is provided a method of generating an indication of where, within a geographical region, a mobile unit can move to from a specified origin in the geographical region using a network of navigable elements in the geographical region and in accordance with a total movement budget specified for the mobile unit, the method comprising: for each sub-region of a set of one or more sub-regions of the geographical region, associating one or more corresponding utilization amounts with said sub-region; identifying an initial navigable element that corresponds to the origin; performing a sequence of steps, wherein each step comprises: using an identification function to try to identify an additional navigable element, wherein the additional navigable element is a neighbour of an already-identified navigable element and can be reached by the mobile unit from the origin in accordance with the total movement budget; and in response to the identification function identifying an additional navigable element of at least one sub-region, performing an update for at least one utilization amount corresponding to a sub-region for the identified additional navigable element; wherein, for each sub-region of the set of one or more sub-regions, the identification function is arranged to ignore at least one of the unidentified navigable elements of that sub-region if a group comprising the one or more utilization amounts that correspond to that sub-region and that have passed a corresponding predetermined threshold meets an ignore criterion; and generating the indication of where the mobile unit can move to according to the navigable elements that have been identified.

In some embodiments, the identification function and/or the update is based, at least in part, on a classification, from a predetermined set of classifications, associated with the identified additional navigable element, wherein the classifications in the predetermined set of classifications are ranked such that a first navigable element having a higher ranked classification than a second navigable element is indicative of the first navigable element being more likely than the second navigable element to be: (a) used for route planning; and/or (b) of importance or utility for transit through the geographical region. In particular, the identification function and/or the update may be biased towards navigable elements of higher classification.

In some embodiments, performing said update for a utilization amount comprises adjusting said utilization amount in accordance with an amount having a magnitude that is dependent on the classification of the identified additional navigable element. The magnitude for the adjustment that is dependent on the classification of the identified additional navigable element may change monotonically according to increasing classification rank.

In some embodiments, for at least one sub-region of the set of one or more sub-regions, the method comprises associating a corresponding subset of the predetermined set of classifications with said sub-region, and, for said sub-region, the identification function is arranged to ignore unidentified navigable elements of said sub-region having a classification in the subset. With such an embodiment, the method may comprise updating the subset corresponding to the sub-region for the identified additional navigable element in response to the identified additional navigable element satisfying an update criterion (where the update criterion may comprise the classification rank for the identified additional navigable element being higher than the classification rank of any already-identified navigable elements of the sub-region for the identified additional navigable element). The method may also then comprise, in response to updating the subset corresponding to the sub-region for the identified additional navigable element, for at least one utilization amount corresponding to the sub-region for the identified additional navigable element, setting said utilization amount to a value in a range bounded by a corresponding predetermined initial value for said utilization amount and a current value of said utilization amount. Additionally or alternatively, at least one subset may comprise one or more classifications of lower rank than the highest classification rank of any already-identified navigable elements of the corresponding sub-region.

In some embodiments, for each sub-region of the set of one or more sub-regions, the one or more corresponding utilization amounts comprise a utilization amount for at least one classification of the predetermined set of classifications, and wherein performing said update comprises updating the utilization amount that corresponds to the classification of the identified additional navigable element. In some such embodiments, for each sub-region of the set of one or more sub-regions, the at least one of the unidentified navigable elements of that sub-region ignored by the identification function comprises navigable elements of a given classification if the corresponding utilization amount for the given classification has passed the corresponding predetermined threshold.

In some embodiments, performing said update for a utilization amount comprises adjusting said utilization amount in accordance with an amount having a magnitude dependent on a length of the identified additional navigable element, wherein the magnitude dependent on the length of the identified additional navigable element for the adjustment increases monotonically according to increasing length.

In some embodiments, the method comprises: for each sub-region of the one or more sub-regions, initializing each of the corresponding one or more utilization amounts to a corresponding predetermined initial value; wherein: (a) performing said update for a utilization amount comprises increasing said utilization amount, the corresponding predetermined threshold being greater than the corresponding predetermined initial value; or (b) performing said update for a utilization amount comprises decreasing said utilization amount, the corresponding predetermined threshold being less than the corresponding predetermined initial value; or (c) performing said update for a utilization amount comprises determining to leave said utilization amount unchanged.

In some embodiments, the performing said update for a utilization amount comprises adjusting said utilization amount in accordance with an amount having a magnitude dependent on the number of sub-regions that contain at least a part of the identified additional navigable element, wherein the magnitude dependent on the number of sub-regions that contain at least a part of the identified additional navigable element increases monotonically according to the number of sub-regions that contain at least a part of the identified additional navigable element. The magnitude dependent on the number of sub-regions that contain at least a part of the identified additional navigable element may be a first predetermined value if the number of sub-regions that contain at least a part of the identified additional navigable element is 1, and may be a second value greater than the first predetermined value otherwise. For this, the first predetermined value may be 0 or 1.

In some embodiments: (a) the identification function is arranged to not ignore any unidentified navigable elements that satisfy one or more predetermined criteria; or (b) for each sub-region of the set one or more sub-regions, the identification function is arranged to ignore all of the unidentified navigable elements of that sub-region if the group comprising the one or more utilization amounts that correspond to that sub-region and that have passed the corresponding predetermined threshold meets the ignore criterion.

In some embodiments, the ignore criterion specifies that: (a) the group comprises at least a predetermined number of utilization amounts (wherein the predetermined number of utilization amounts may be 1); and/or (b) the group comprises one or more specific utilization amounts.

In some embodiments, the method comprises terminating the sequence of steps in response to the identification function not identifying an additional navigable element.

In some embodiments, the mobile unit is a person or a vehicle.

In some embodiments, the total movement budget specified for the mobile unit comprises one or more of: (a) an amount of energy or fuel available for moving the mobile unit; (b) an amount of time available for moving the mobile unit; and (c) a maximum distance for moving the mobile unit.

In some embodiments, the method comprises: in response to at least a part of the identified additional navigable element not being contained by the set of one or more sub-regions, updating the set of one or more sub-regions by including one or more further sub-regions so that the identified additional navigable element is contained by the set of one or more sub-regions.

In some embodiments, the method comprises: providing, via a graphical user interface, a representation of the indication of where the mobile unit can move to. The representation may be provided to an operator of the mobile unit. The mobile unit may be a vehicle, with the operator being a driver of the vehicle or a passenger of the vehicle.

In some embodiments, the method comprises: in response to receiving, based on the indication of where the mobile unit can move to, a selection of a destination within the geographical region, providing navigation instructions for moving the mobile unit to the destination. The navigation instructions may be provided to an operator of the mobile unit (where the mobile unit may be a vehicle, the operator being a driver of the vehicle). The mobile unit may be a vehicle comprising a driving system for autonomous driving of the vehicle, and the navigation instructions may be provided to the driving system for use by the driving system to control movement of the vehicle to the destination.

According to a second aspect of the invention, there is provided a system arranged to carry out the above-mentioned first aspect or any embodiment thereof.

According to a third aspect of the invention, there is provided a computer program which, when executed by one or more processors, causes the one or more processors to carry out the above-mentioned first aspect or any embodiment thereof. The computer program may be stored on a computer-readable medium.

BRIEF DESCRIPTION OF THE DRAWINGS

Embodiments of the invention will now be described, by way of example only, with reference to the accompanying drawings, in which:

FIG. 7*a* shows a representation of an indication of where a mobile unit can move to, where the indication is generated using a known technique;

FIG. 7*b* shows a representation of an indication of where a mobile unit can move to, where this indication is generated using an embodiment of the invention;

DETAILED DESCRIPTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figures 1A, 1B:
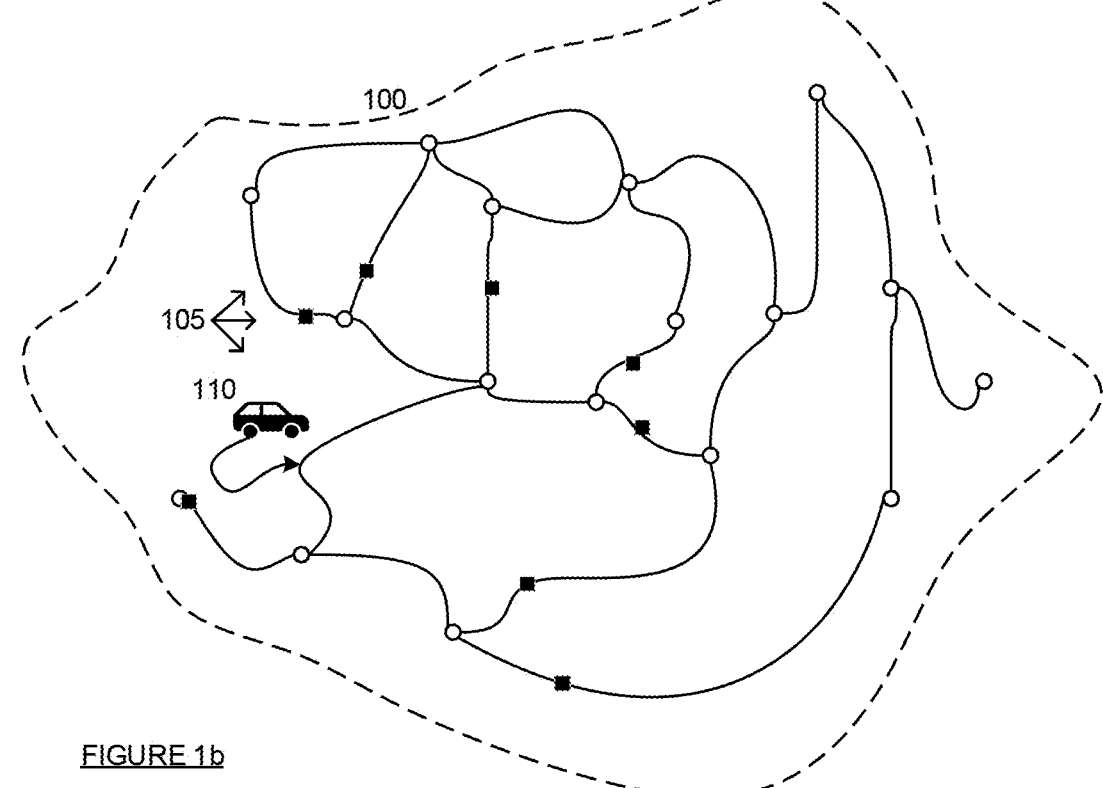
FIGS. 1*a* and 1*b* illustrate a geographical region comprising a network of navigable elements.

FIG. 1*a* illustrates a geographical region 100. The geographical region 100 could be any geographical area, and may comprise (or represent) a part or all of: one or more continents and/or one or more countries and/or one or more states and/or one or more counties and/or one or more municipalities, etc. The geographical region 100 illustrated in FIG. 1*a* is shown as a single connected area, but it will be appreciated that the geographical region 100 may comprise multiple disconnected areas. As shown in FIG. 1*a*, the geographical region 100 comprises a network 105 of navigable elements—the navigable elements are illustrated in FIG. 1*a* as respective solid lines connecting respective locations, illustrated as nodes/circles. As discussed above, a navigable element may be viewed as a part of a transport network 105 along which travel may be conducted by a mobile unit (where the mobile unit could be, for example, a vehicle, a person, etc.)—thus, for example, the navigable elements that form the network 105 may comprise: one or more roads, or parts thereof; and/or one or more routes, or parts thereof, taken by ferries or trains; and/or one or more paths, or parts thereof, for pedestrians; and/or one or more cycle paths, or parts thereof; etc.

An example mobile unit 110 is illustrated in FIG. 1*a*. A total movement budget $B_{Total}$ may be associated with, or specified for, the mobile unit 110. The total movement budget $B_{Total}$ acts as a constraint on a journey (i.e. the accumulated movement) that the mobile unit 110 may perform using the network 105. For example, the total movement budget $B_{Total}$ may comprise, or specify, one or more of:

(a) an amount of energy or fuel available for moving the mobile unit 110—for example, an amount of petrol/diesel/gas stored by the mobile unit 110 or, if the mobile unit 110 is an electric vehicle, an amount of electrical charge available (or battery level) for moving the electric vehicle;

(b) an amount of time available for moving the mobile unit 110—for example, a maximum journey time for travelling along the network 105 may be specified; and (c) a maximum distance for moving the mobile unit 110—for example, a maximum further distance from the mobile unit's 110 current location for travelling along the network 105 may be specified.

Given the total movement budget $B_{Total}$ specified for the mobile unit 110, the mobile unit 110 may only be able to reach certain parts of the geographical region 100 or, put another way, may only be able to reach, or move to, certain navigable elements of the network 105. For example, FIG. 1*b* is the same as FIG. 1*a*, but with squares located on certain navigable elements to indicate how far the mobile unit 110 can reach within the network 105 from its current location given a particular total movement budget $B_{Total}$ for the mobile unit 110.

Viewed one way, the total movement budget $B_{Total}$ may initially be a positive value (such as an amount of fuel/charge/time/distance/etc.). Movement along each navigable element and/or movement from one navigable element to another navigable element may have an associated budget/movement cost (in terms of fuel/charge/time/distance/etc). Indeed, sometimes the budget cost/change associated with movement along each navigable element, or movement from one navigable element to another navigable element, may actually be negative (e.g. if the budget cost is being measured as charge taken from an electric vehicle's battery, then movement downhill along a navigable element may result in recharging the battery). Thus, the mobile unit 110 may keep moving along navigable elements until the accumulated budget cost for the journey equals the total movement budget $B_{Total}$. Alternatively, the mobile unit 110 may keep moving along navigable elements, with the total movement budget $B_{Total}$ decremented by the corresponding budget cost, until the total movement budget $B_{Total}$ equals 0 (in which case, the total movement budget $B_{Total}$ may be viewed as a remaining budget amount). Other ways of viewing/managing this are, of course, possible. In general, though, movement by the mobile unit 110 along a navigable element and/or movement from one navigable element to another navigable element consumes/accumulates movement budget (or budget cost), and movement of the mobile unit 110 may continue until the consumed/accumulated movement budget (or budget cost) matches the total movement budget $B_{Total}$.

Additionally, it should be noted that there may be several different routes from a current location for a mobile unit 110 to a particular other location, and these different routes may have different associated budget costs, depending on the navigable elements involved for each route. Moreover, this may depend on how the total movement budget $B_{Total}$ is being measured—for example, a first route may be shorter than a second route and, therefore, has a lower distance cost than the second route (and may therefore require less budget if the total movement budget $B_{Total}$ is specified in terms of a maximum movement distance), but the second route may have a lower fuel cost than the first route (and may therefore require less budget if the total movement budget $B_{Total}$ is specified in terms of an amount of fuel/energy for the mobile unit 110).

Of course, the network 105 shown in FIGS. 1a and 1b only has a very small number of navigable elements in a simple configuration, for ease of illustration. Real life networks 105 are much more complex with substantially more navigable elements. Generating a useful and accurate estimate of where, within the geographical region 100, a mobile unit 110 can move to from a specified origin in the geographical region 100 (such as a current location of the mobile unit 110 or a known future location for the mobile unit 110) using the network 105 and in accordance with the total movement budget $B_{Total}$ specified for the mobile unit 110 can be very challenging, due to the very large number of navigable elements (and associated data to represent the network 105) involved and due to the fact that different routes between two locations can have different budget costs. This is made even more challenging if this process needs to be performed quickly for a particular purpose. Current techniques for performing this can take many minutes to complete, particularly if the specified total movement budget $B_{Total}$ is large so that the reachable area for the mobile unit 110 is also large (e.g. if the total movement budget $B_{Total}$ represents a full tank of fuel or a full battery charge)—as discussed above, this delay can be unacceptable in some situations. Whilst some current techniques for performing this may be configured to complete quickly, the resulting estimates of where the mobile unit 110 can move to are usually inaccurate or are at a very low resolution and, therefore, they are of less use than desired.

Figure 2:
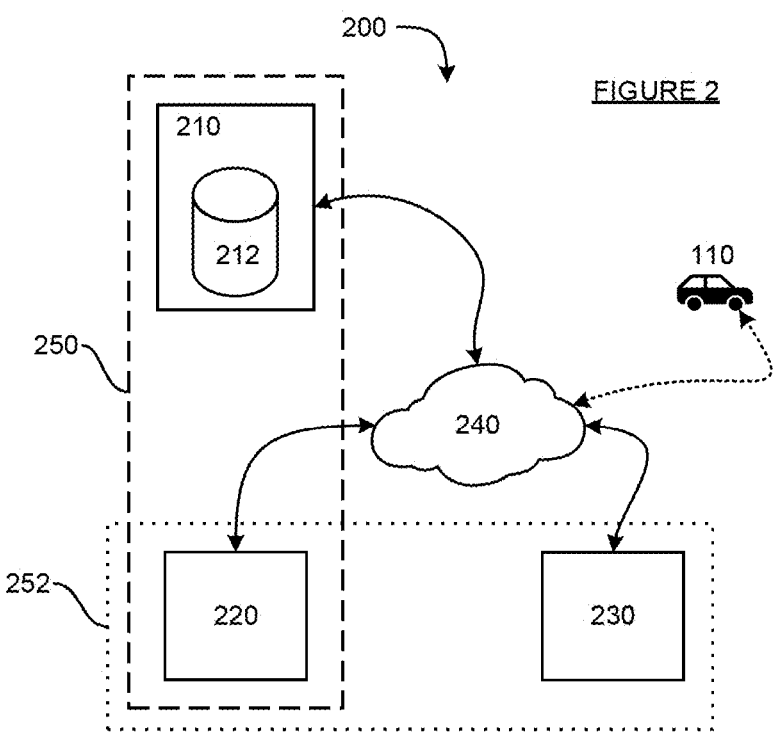
FIG. 2 schematically illustrates a system according to some embodiments of the invention.

FIG. 2 schematically illustrates a system 200 according to some embodiments of the invention. The system 200 comprises: a database system 210 storing one or more map databases 212; a navigation system 220; and a client device 230. In summary, the client device 230 may request that the navigation system 220 generates an indication of where, within the geographical region 100, the mobile unit 110 can move to from a specified origin in the geographical region 100 using the network 105 of navigable elements in the geographical region 100 and in accordance with the total movement budget $B_{Total}$ specified for the mobile unit 110. The client device 230 may provide the navigation system 220 with data specifying the origin and the total movement budget $B_{Total}$ (and, potentially, data relating to the budget or the mobile unit 110, for example: fuel/charge consumption details; a current fuel/charge level; etc.). The database 212 comprises data regarding the navigable elements of the network 105, where this data may be used to determine where the mobile unit 110 can move to. Thus, in response to the request from the client device 230, the navigation system 220 may access data from the database 212 and use this data to generate the indication of where, within the geographical region 100, the mobile unit 110 can move to. The navigation system 220 may then provide this indication back to the client device 230, for example so that that client device 230 can perform navigation assistance/planning/control as appropriate. This process shall be described in more detail later.

FIG. 2 shows the database system 210 and the navigation system 220 communicating with each other via one or more communications networks 240 (such as the internet, a telecommunications network, a satellite communications network, etc.) and, likewise, the client device 230 and the navigation system 220 communicating with each other via one or more communication networks 240. However, this configuration is optional. In particular, in some embodiments, the database system 210 may be local to the navigation system 220, so that they together form part of a single system 250 (illustrated by the dashed line in FIG. 2), in which case the database system 210 and the navigation system 220 do not need to communicate via such a communication network 240. For example, the system 250 may be operated as a cloud-based service accessible to client devices 230 via the internet 240. Additionally or alternatively, the client device 230 may be local to the navigation system 220, so that they together form part of a single system 252 (illustrated by the dotted line in FIG. 2), in which case the client device 230 and the navigation system 220 do not need to communicate via such a communication network 240. In some embodiments, the database system 210, the client device 230 and the navigation system 220 are all local to each other, e.g. for a navigation device configured to work in an offline mode, in which case a communication network 240 is not needed. Other configurations are, of course possible.

The system 200 (or one or more of the components thereof) may be part of (or may be stored by or located at) the mobile unit 110—for example: the system 200 (or part thereof) may be a built-in sat-nav system that is part of a vehicle; the system 200 (or part thereof) may be a built-in system for an autonomous vehicle that is arranged to control movement of that vehicle; the client device 230 may be a mobile telephone, carried by a person (the mobile unit 110), that is arranged to communicate with a cloud-based service operating the system 250; etc. Alternatively, the system 200 may be separate from the mobile unit 110.

In some embodiments, in particular when the system 200 (or one or more of the components thereof) is not integral to the mobile unit 110, the mobile unit 110 may be arranged to communicate with one or more of the database system 210, the client device 230 and the navigation system 220 via one or more communication networks 240 (e.g. to provide data indicating one or more of a current location of the mobile unit 110, a current speed of the mobile unit 110, a current fuel/energy consumption rate of the mobile unit 110, a current fuel/energy level of the mobile unit 110, etc.).

As mentioned above, the database 212 stores data about the navigable elements of the network 105, where this data may be used to determine where the mobile unit 110 can move to. For example, the network 105 may be viewed as a graph, in which each node of the graph corresponds to a respective geographical location within the geographical region 100 and each edge of the graph corresponds to a navigable element between two respective nodes (i.e. between two respective geographical locations). Given such a graph representation for the network 105, the database 212 may store data for each node (or geographical location) of the graph (such as geographical coordinates, identification of neighbouring/linked nodes in the graph, etc.) and/or data for each edge (or navigable element). Such graphs may be directed or undirected, depending on the particular representation and details provided for the network 105. It will be appreciated, of course, that other representations of the network 105 are possible, and that the database 212 may, therefore, store data representing the network 105 in a variety of ways. Since such databases 212 storing such data (often referred to as map data) are well-known, further details shall not be provided herein except as necessary to further describe embodiments of the invention. In general, though, the database 212 may store, for each navigable element of the network 105, various metadata, such as data specifying one or more of: coordinates of the ends of the navigable element; name of the navigable element; length of the navigable element; geometry of the navigable element (e.g. one or more of altitude, elevation, slope, curvature, etc. of the navigable element); speed restrictions for the navigable element; expected speed of movement at one or more times of day (or dates or days of the week) for the navigable element; which other navigable elements are connected to this navigable element (i.e. which other navigable elements neighbour this navigable element); movement/turning restrictions that may be performed on/at the navigable element; one or more categories/classifications of the navigable element (e.g. motorway, dual-carriageway, etc.); current or realtime data obtained in relation to the navigable element (e.g. data specifying a current speed of movement by one or more mobile units along the navigable element; data specifying temporary closure or restriction(s) for the navigable element; etc); etc.

Figure 3:
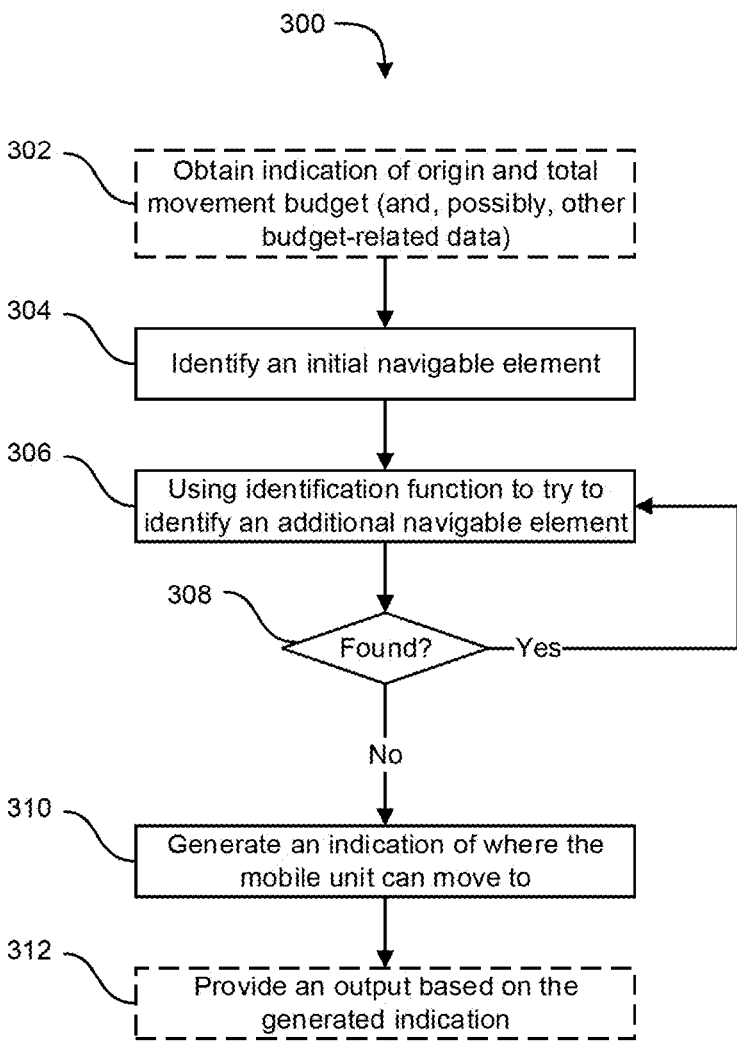
FIG. 3 is a flowchart illustrating a method that may be performed by the system of FIG. 2 according to some embodiments of the invention.

FIG. 3 is a flowchart illustrating a method 300 that may be performed by the system 200 of FIG. 2 according to some embodiments of the invention.

At an optional step 302, the system 200 may obtain an indication of an origin in the geographical region 100 (such as a current location of the mobile unit 110 or a known future location for the mobile unit 110). For example: (a) an operator of the client device 230 may provide/input an indication of the origin on a map being displayed by the client device 230; (b) an operator of the client device 230 may provide/input details of an address of the origin via the client device 230; (c) the client device 230 (or the mobile unit 110) may comprise a positioning system (e.g. a GPS system) for determining a location of the client 230 (or the mobile unit 110), and this determined location may be used to specify the origin; (d) an expected future location for the origin may be obtained from a known schedule for the mobile unit 110; etc. Thus, the navigation system 220 may obtain an indication of a specified origin from a variety of sources in a variety of formats. However, it will be appreciated that this step of obtaining an indication of the origin is optional—for example, the navigation system 220 may already have an indication of a specified origin (e.g. the origin may be preconfigured, or may be a default origin).

Additionally, or alternatively, at the optional step 302, the system 200 may obtain an indication of the total movement budget $B_{Total}$ for the mobile unit 110. For example: (a) an operator of the client device 230 may provide/input such an indication via the client device 230; (b) the mobile unit 110 may comprise a system for providing data relating to the mobile unit 110, and this data may be used to specify the total movement budget $B_{Total}$ (e.g. a current fuel-level or energy/battery-level for the mobile unit 110); etc. Thus, the navigation system 220 may obtain an indication of a specified total movement budget $B_{Total}$ from a variety of sources in a variety of formats. However, it will be appreciated that this step of obtaining an indication of the total movement budget $B_{Total}$ is optional—for example, the navigation system 220 may already have an indication of a specified total movement budget $B_{Total}$ (e.g. total movement budget $B_{Total}$ may be preconfigured, or may be a default budget).

The optional step 302 may also comprise obtaining additional budget-related data $D_{Budget}$. For example:

(a) The additional budget-related data $D_{Budget}$ may specify the date and/or the day of the week and/or the time of day for performing (e.g. starting) the intended journey. The date and/or day of the week and/or time can affect how the movement budget is consumed for that journey—journeys can take more or less time at certain times of day or on certain days of the year, so this may impact where the mobile unit 110 can move to if, for example, the total movement budget $B_{Total}$ is specified based on a journey time or fuel/energy level.

(b) The additional budget-related data $D_{Budget}$ may specify an indication of the type or category (e.g. model) for the mobile unit 110. Mobile units 110 of different types or category may consume movement budget differently from each other. For example, different types of mobile unit 110 may have different respective expected fuel/energy consumption rates (or respective profiles mapping different speeds to expected consumption rates), so this may impact on where the mobile unit 110 can move to if, for example, the total movement budget $B_{Total}$ is specified based on a fuel/energy level. Likewise, different types of mobile unit 110 may take different amounts of time to perform certain manoeuvres (e.g. performing a turn that crosses a lane on a road can take substantially longer for a lorry than for a car), so this may impact on determining where the mobile unit 110 can move to if, for example, the total movement budget $B_{Total}$ is specified based on a journey time.

(c) The additional budget-related data $D_{Budget}$ may comprise data relating to a person associated with the mobile unit 110. For example, different people may walk at different speeds; different drivers of vehicles have different driving styles which may impact on speed and/or fuel/energy consumption rates.

As discussed above, in some embodiments, the step 302 may involve the client device 230 providing a request to the navigation system 220 to generate the indication of where the mobile unit 110 can move to. This request may comprise some or all of the data discussed above for the step 302 (e.g. data indicating the origin, data indicating the total movement budget $B_{Total}$, other budget-related data $D_{Budget}$, etc.), so that the navigation system 220 obtains this data via the received request. In response to receiving such a request, the navigation system 220 may obtain further information that it needs to satisfy the request (if any). For example, the navigation system 220 may need to obtain the location of the mobile unit 110 directly from the mobile unit 110 (e.g. to specify the origin); the navigation system 220 may need to obtain an indication of a current amount of fuel/energy available to the mobile unit 110 directly from the mobile unit 110 (e.g. to specify some or all of the total movement budget $B_{Total}$ or some or all of the budget-related data $D_{Budget}$); the navigation system 220 may need to obtain data relating to a driver (e.g. so that their driving style can be ascertained) from a database (not shown in FIG. 2) containing driver profile data; etc. The navigation system 220 may then generate the indication of where the mobile unit 110 can move to, as discussed below.

At a step 304, the navigation system 220 identifies an initial navigable element of the network 105 that corresponds to the specified origin. As discussed above, the origin may be specified in a variety of ways and in a variety of formats. However, there are many well-known mechanisms (often referred to as "map-matching") for identifying a navigable element that corresponds to the origin (regardless of the format in which the origin may have been specified). Thus, the navigation system 220 may use the database system 210 to identify an initial navigable element of the network 105 that corresponds to the specified origin (e.g. by providing details of the specified origin to the database system 210, with the database system 210 then being arranged to use the database 212 to identify the corresponding navigable element and provide an indication of this navigable element back to the navigation system 220).

Figure 4:
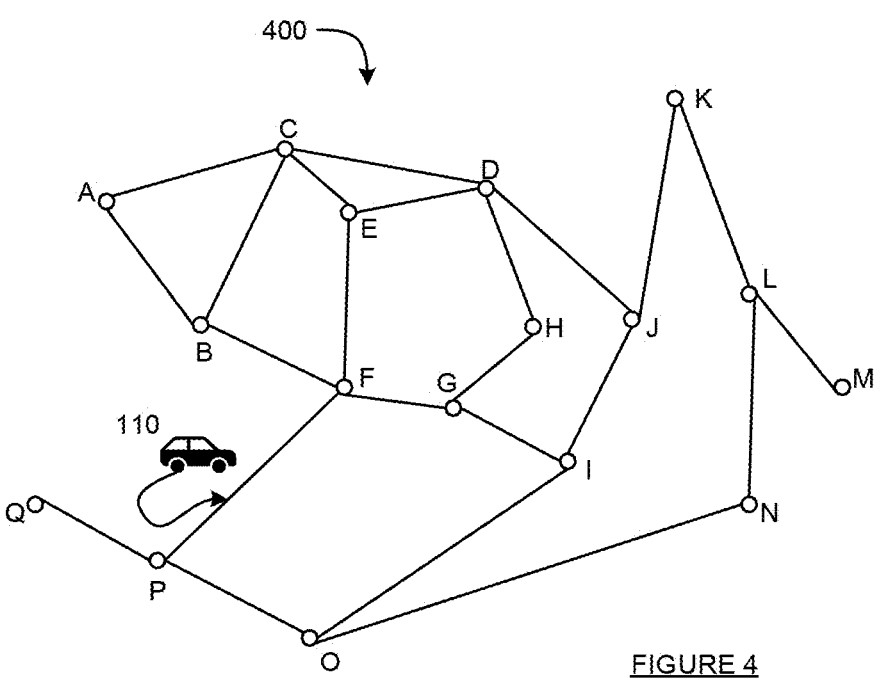
FIG. 4 illustrates a graph representation of the network of navigable elements shown in FIGS. 1*a* and 1*b;*

As an example, FIG. 4 illustrates a graph representation 400 of the network 105 of FIGS. 1a and 1b. In the graph representation 400, the nodes (geographical locations) are labelled with letters A to Q. Each edge (navigable element) may be referenced by the letters for the two nodes that that edge connects, such as an edge CD or FB. In this example, the specified origin is the current location of the mobile unit 110, so that the navigable element that corresponds to the origin is the navigable element represented by the edge PF, on which the mobile unit 110 is considered to be currently located.

At a step 306, the navigation system 220 uses an identification function $\mathcal{F}$ to try to identify (or select or choose) an additional navigable element, where this additional navigable element (i) is a neighbour of (i.e. is connected to, or can be travelled along from, or can be reached using) an already-identified navigable element and (ii) can be reached by the mobile unit 110 from the origin in accordance with the total movement budget $B_{Total}$. A decision is then made at a step 308 as to whether or not to perform the step 306 again—in particular, if an additional navigable element has just been identified at the most recent performance of the step 306, then processing returns to the step 306 for another iteration, to try to identify yet another additional navigable element; otherwise, processing continues at a step 310. Thus, the method 300 performs a sequence of steps, wherein each step comprises the step 306 (i.e. uses the identification function $\mathcal{F}$ to try to identify an additional navigable element, where this additional navigable element is a neighbour of an already-identified navigable element and can be reached by the mobile unit 110 from the origin in accordance with the total movement budget $B_{Total}$).

Now, the identification function $\mathcal{F}$ may operate in a variety of ways—indeed, many ways of achieving this are already known.

For example, given a graph representation of the network 105 (such as that shown in FIG. 4), there are many known algorithms for exploring the whole graph, such as: depth-first traversal (see https://en.wikipedia.org/wiki/Depth-first_ search, the entire disclosure of which is incorporated herein by reference); breadth-first traversal (see https://en.wikipedia.org/wiki/Breadth-first_search, the entire disclosure of which is incorporated herein by reference); Dijkstra's algorithm (see https://en.wikipedia.org/wiki/Dijkstra%27s_ algorithm, the entire disclosure of which is incorporated herein by reference); etc. Such algorithms operate as an iterative process (as per the steps 306 and 308) and, at each iteration, they use a selection criterion to select, from the set of currently not-selected (or not-settled) nodes that neighbour at least one already-selected (or already-settled) node, a node to select next—thus, this inherently identifies an edge (navigable element) that connects the newly-selected node to the neighbouring already-selected node. The selection criterion varies from algorithm to algorithm (e.g. a depth-first criterion of a depth-first traversal algorithm; a breadth-first criterion for a breadth-first traversal algorithm; a shortest-path criterion, or a criterion for lowest-cost according to an objective function, for Dijkstra's algorithm; etc.). As such graph search/exploration algorithms are well-known, they shall not be described in more detail here. In general, though, such graph search/exploration algorithms may form the basis for the iterative process (as per the steps 306 and 308) to provide the order/sequence in which the nodes of the graph are to be explored/considered and, equivalently therefore, to provide the order/sequence in which edges of the graph are to be explored/considered. Such graph search/exploration algorithms can therefore provide, based on the currently selected/settled nodes of the graph, a candidate next node for selection (according to their respective selection criterion) and, therefore, a candidate next edge of the graph. Thus, the use of such a graph search/exploration algorithm by the identification function $\mathcal{F}$ provides to the identification function $\mathcal{F}$ a candidate next node, or a candidate next navigable element, for consideration (i.e. for possibly being selected/chosen/identified at the step 306). Note that when an algorithm such as Dijkstra's algorithm is being used for this, with the next node being selected/settled according to an objective function, then this objective function may be based on factors different than those specified for the total movement budget $B_{Total}$—for example, the total movement budget $B_{Total}$ may be specified in terms of an amount of fuel/energy, whereas the objective function for Dijkstra's algorithm may be based on a distance or time between respective nodes of the graph (e.g. to provide an optimal—in terms of time or distance—exploration of the graph).

The identification function $\mathcal{F}$ may, at each iteration, access data from the database 212 that relates to a current node (for the present iteration) of the graph and/or data that relates to an edge of the graph (e.g. an edge that is currently under consideration, as part of the iterative process, as forming a journey within the graph, or an edge connected to a current node (for the present iteration) of the graph). The identification function $\mathcal{F}$ may use this data to determine that one or more nodes cannot be reached from a particular neighbouring node (and therefore one or more corresponding edges cannot be selected/identified at the current step 306, i.e. at this current iteration). For example, when considering the node F of the graph 400 of FIG. 4, it is possible that the navigable element represented by the edge FE cannot be travelled in the direction from the node F to the node E (e.g. this navigable element is a one-way street), in which case the node E cannot be selected based on it being a neighbour of the node F. Likewise, if a journey within the graph 400 that is currently under consideration as part of the iterative process has currently reached the node J via the edge DJ, then it is possible that turning restrictions may be in place which prohibit turning from the navigable element represented by the edge DJ onto the navigable element represented by the edge JK, in which case the node K cannot be selected based on it being a neighbour of the node J at this stage of the iterative process. Other possibilities are clearly possible. Thus, the identification function $\mathcal{F}$ may, for the current iteration, discount (i.e. not select) a candidate next node and/or a candidate next edge based on data accessed from the database 212, in which case the identification function $\mathcal{F}$ may determine (as discussed above) a subsequent/next candidate next node/edge for consideration for selection at this iteration.

To cater for the total movement budget $B_{Total}$, the identification function $\mathcal{F}$ may be arranged, for each iteration, to only select a candidate next node (and, therefore a candidate next navigable element) if the identification function $\mathcal{F}$ can (currently) conclude that that node can be reached from the origin according to the total movement budget $B_{Total}$. If the identification function $\mathcal{F}$ cannot (currently) conclude that a candidate next node can be reached from the origin according to the total movement budget $B_{Total}$, then the identification function $\mathcal{F}$ may determine (as discussed above) a subsequent/next candidate next node/edge for consideration for selection at this iteration.

For example, the identification function $\mathcal{F}$ may maintain (and update at each iteration), for each node n encountered whilst exploring the graph, a budget value $b_n$ that indicates how much budget would be required/consumed to reach that node n from the origin. Thus, when the identification function $\mathcal{F}$ considers whether a candidate node X is selectable based on it being a neighbour an already identified node Y, then a new budget value $\hat{b}_X$ for this neighbouring node X may be determined according to the budget value $b_Y$ for that already identified node Y and a budget change $c_{YX}$ associated with movement along the edge from Y to X, e.g. $\hat{b}_X = b_Y + c_{XY}$. Now, the neighbouring node X may never have been encountered before during the iterative process, in which case the budget value $b_X$ associated with the node X may be set to the new budget value $\hat{b}_X$. Alternatively, the neighbouring node X may have previously been encountered during the iterative process, in which case it will have a current budget value b x and, if the new budget value $\hat{b}_X$ is smaller than the current budget value $b_X$, then the budget value $b_X$ is updated to be the new budget value $\hat{b}_X$. The identification function $\mathcal{F}$ may be arranged to discount (i.e. not select) the node X if its budget value $b_X$ exceeds the total movement budget $B_{Total}$. It will, however, be appreciated that other ways are possible for the identification function $\mathcal{F}$ to accommodate the total movement budget $B_{Total}$.

To determine the budget change $c_{YX}$ associated with movement along the edge YX from the node Y to the node X, the identification function $\mathcal{F}$ may use a variety of data, including one or more of:

(a) Data accessed from the database 212 in relation to the edge YX. For example, if the total movement budget $B_{Total}$ is specified based on a total distance travelled by the mobile unit 110, then the budget change $c_{YX}$ may be set to equal (or may be based on) the length of the navigable element corresponding to the edge YX, as specified by data for that navigable element in the database 212. Likewise, if the total movement budget $B_{Total}$ is specified based on a total time of travel for the mobile unit 110, then the budget change $c_{YX}$ may be set to equal (or may be based on) an expected time to complete travel along the navigable element corresponding to the edge YX from the node Y to the node X as specified by data for that navigable element in the database 212, or may be derived from data for that navigable element in the database (e.g. a length of the navigable element and an expected or current average speed of travel from the node Y to the node X), and/or may be based on one or more speed restrictions for the navigable element as specified by data for that navigable element in the database 212 (thereby imposing a minimum time to complete travel along the navigable element).

(b) Data accessed from the database 212 in relation to the node Y. For example, if the total movement budget $B_{Total}$ is specified based on a total time of travel for the mobile unit 110, then the budget change $c_{YX}$ may be set, at least in part, based on an expected time to transit through/across the node Y (e.g. a time to make a turn at the node Y or a time to pass through traffic lights at the node Y), as specified by data for that node in the database 212.

(c) Some or all of the budget-related data $D_{Budget}$. For example:

The budget-related data $D_{Budget}$ may specify a date and/or a day of the week and/or a time for performing the journey (e.g. a start day/time for the journey, from which a day/time to start travelling along the edge YX may be determined), and this may be used in conjunction with data from the database 212 specifying an expected speed of movement at one or more times of day for the navigable element corresponding to the edge YX to determine a corresponding expected time to complete travel along the navigable element corresponding to the edge YX. Thus, if the total movement budget $B_{Total}$ is specified based on a total time of travel for the mobile unit 110, then the budget change $c_{YX}$ may be set to equal (or may be based on) this determined expected time to complete travel along the navigable element corresponding to the edge YX.

The budget-related data $D_{Budget}$ may specify an expected fuel/energy consumption rate for the mobile unit 110 and/or one or more fuel/energy consumption rate profiles for the mobile unit 110 (e.g. a fuel/energy rate for the mobile unit 110 when the mobile unit 110 is travelling at different respective speeds or on a navigable element with a particular slope or terrain type, as indicated by data from the database 212) and/or one or more types/categories for the mobile unit 110. Based on this data, a corresponding expected usage (or even gain) of fuel/energy when travelling along the navigable element corresponding to the edge YX may be determined. Thus, if the total movement budget $B_{Total}$ is specified based on a fuel/energy amount for the mobile unit 110, then the budget change $c_{YX}$ may be set to equal (or may be based on) this determined expected fuel/energy usage to complete travel along the navigable element corresponding to the edge YX.

(d) Data indicating which other edge in the graph is currently under consideration (as part of the iterative process) in order to arrive at the node Y so as to then proceed to the node X along the edge YX. For example, moving from a first navigable element (edge) to the navigable element represented by the edge YX may require the mobile unit 110 to perform a time-consuming manoeuvre (such as crossing a lane of oncoming traffic), whereas moving from a second navigable element (edge) to the navigable element represented by the edge YX may not require the mobile unit 110 to perform a time-consuming manoeuvre. Thus, knowledge of which edge in the graph is currently under consideration (as part of the iterative process) in order to arrive at the node Y so as to then proceed to the node X may be used (potentially in conjunction with data from the database 212 corresponding to those edges), for example, to determine an expected time to complete travel along the navigable element corresponding to the edge YX. Thus, if the total movement budget $B_{Total}$ is specified based on a total time of travel for the mobile unit 110, then the budget change $c_{YX}$ may be set to equal (or may be based on) this determined expected time to complete travel along the navigable element corresponding to the edge YX.

The sequence of steps 306 may need initializing to cater for the situation such as shown in FIG. 4 in which the origin (or initial location for the graph exploration/search algorithms) is not at one of the nodes, and is, instead, along one of the edges—for example, for depth-first traversal or breath-first traversal, one of the nodes at the end of the edge having the origin may be selected, potentially arbitrarily; for Dijkstra's algorithm, one of the nodes at the end of the edge that has a shortest-path (or a lowest-cost according to the objective function being used), for reaching that node from the origin or, alternatively, both nodes at the end of the edge could have their respective objective function value initialized based on the cost, according to the objective function, to move from the origin to those nodes.

Thus, as discussed above, any of the well-known graph search/exploration algorithms may be used as an iterative process for the steps 306 and 308 of the method 300, whereby at each iteration, the algorithm uses an identification function $\mathcal{F}$ to select an additional navigable element, wherein this selection may take into account data from the database 212 (e.g. relating to the topology of the network 105, movement restrictions when travelling within the network 105, etc.) and takes into account the total movement budget $B_{Total}$.

Figure 5A:
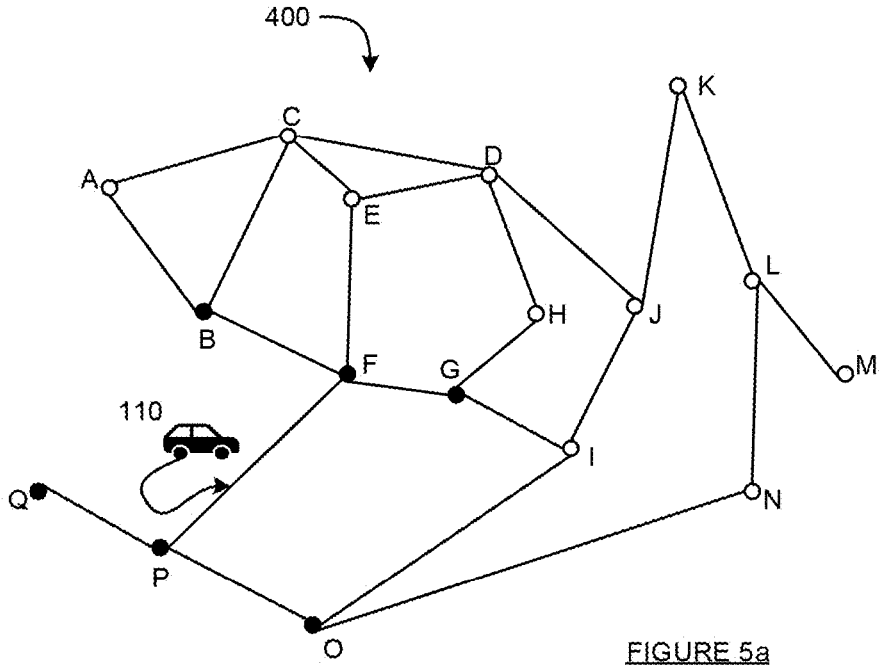
FIGS. 5*a*-5*e* show the graph representation of FIG. 4, but with a respective indication of where a mobile unit can move to also represented.

At the step 310, the navigation system 220 generates the indication of where the mobile unit 110 can move to according to the navigable elements that have been identified (via the steps 304 and 306). Such an indication may take many forms. For example:

(a) Based on the graph representation 400 of FIG. 4, the indication may comprise data indicating which nodes can be reached by the mobile unit 110. For example, FIG. 5a shows the graph representation 400 of FIG. 4, with certain nodes filled in to represent the nodes that can be reached by the mobile unit 110, in line with the example of FIG. 1b.

Figure 5B:
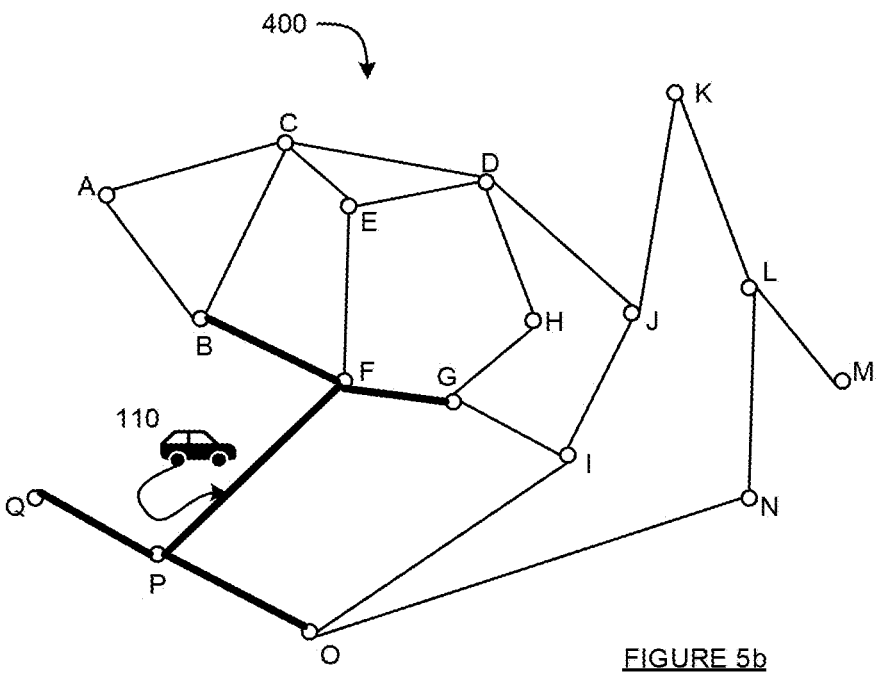

(b) Based on the graph representation 400 of FIG. 4, the indication may comprise data indicating which edges can be fully traversed by the mobile unit 110. For example, FIG. 5b shows the graph representation 400 of FIG. 4, with certain edges emphasized to represent the edges that can be fully traversed by the mobile unit 110, in line with the example of FIG. 1b.

Figure 5C:
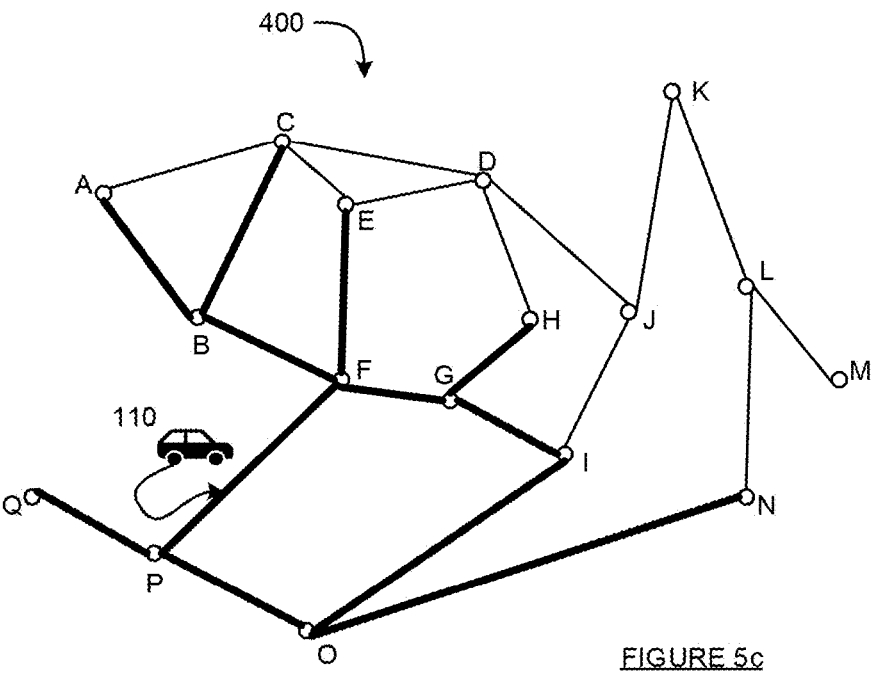

(c) Based on the graph representation 400 of FIG. 4, the indication may comprise data indicating which edges can be fully or partially traversed by the mobile unit 110. For example, FIG. 5c shows the graph representation 400 of FIG. 4, with certain edges emphasized to represent the edges that can be fully or partially traversed by the mobile unit 110, in line with the example of FIG. 1b.

Figure 5D:
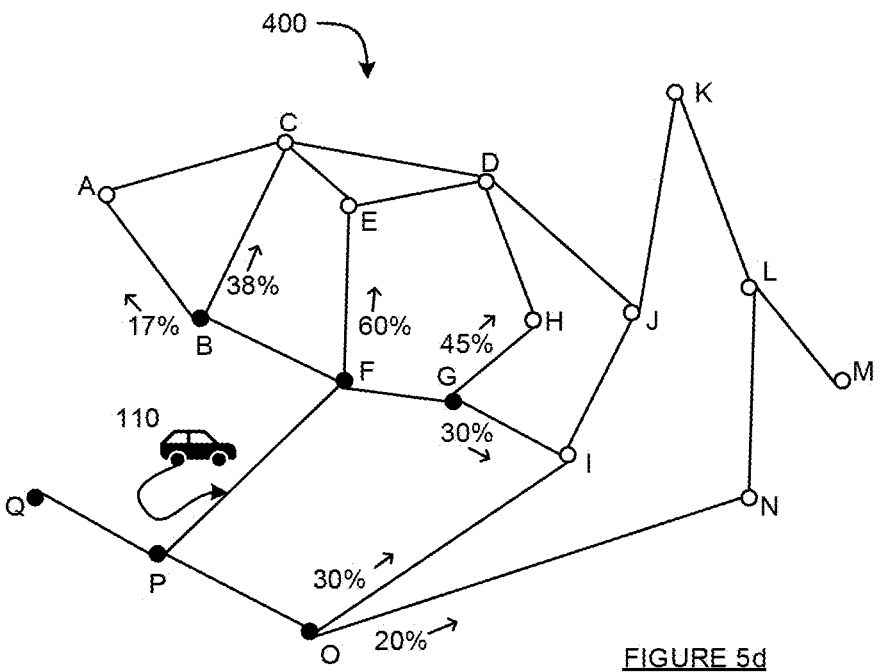

(d) Based on the graph representation 400 of FIG. 4, the indication may comprise data indicating which nodes can be reached by the mobile unit 110, together with an indication (e.g. distance, percentage, etc.) of how far along navigable elements towards further nodes the mobile unit 110 could reach (with this being, for example, based on the budget values stored for the nodes that can be reached). For example, FIG. 5d shows the graph representation 400 of FIG. 4, with certain nodes filled in to represent the nodes that can be reached by the mobile unit 110, and an indication of how far along certain navigable elements the mobile unit 110 could still travel, in line with the example of FIG. 1b. Here, for example, the node G is reachable, but the nodes H and I are not reachable from the node G within the total movement budget $B_{Total}$. However, the budget value $b_G$ for the node G indicates that a certain amount of movement budget may remain once the mobile unit 110 has reached the node G, so that a certain amount of movement towards the node H along the navigable element corresponding to the edge GH is possible (e.g. 45% of the way along this navigable element) and a certain amount of movement towards the node I along the navigable element corresponding to the edge GI is possible (e.g. 30% of the way along this navigable element).

Figure 5E:
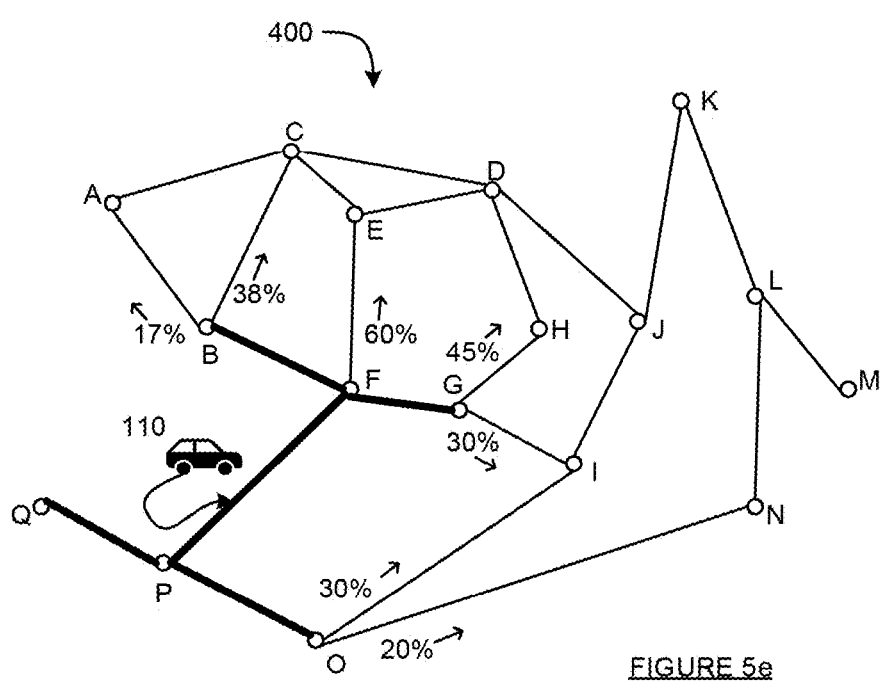

(e) Based on the graph representation 400 of FIG. 4, the indication may comprise data indicating which edges can be fully traversed by the mobile unit 110, together with an indication (e.g. distance, percentage, etc.) of how far along navigable elements towards further nodes the mobile unit 110 could reach (with this being, for example, based on the budget values stored for the nodes that can be reached). For example, FIG. 5e shows the graph representation 400 of FIG. 4, with certain edges emphasized to represent the edges that can be fully traversed by the mobile unit 110, and an indication (similar to FIG. 5d) of how far along certain navigable elements the mobile unit 110 could still travel, in line with the example of FIG. 1b.

(f) The indication could comprise data indicating the locations of the extremities of the routes that can be travelled by the mobile unit 110 within the total movement budget $B_{Total}$, e.g. coordinates for the squares shown in FIG. 1b.

(g) The indication could comprise, for each of a plurality of areas within the geographical region 100, a flag indicating whether or not a navigable element located (at least in part) in that area has been identified at the step 306. For example, the geographical regional 100 could be partitioned into square or rectangular areas, and the indication could take the form of a 2-dimensional array, where each element of the array corresponds to one of those areas, and the value of each element indicates whether or not a navigable element located (at least in part) in that area has been identified at the step 306. In some embodiments, the dimensions of the areas may be predetermined; in other embodiments, the size of the 2-dimensional array may be predetermined (so that the dimensions and locations of the areas are then determined based on the size of the 2-dimensional array). This approach provides an efficient and effective way of storing/generating the indication, and can provide for an efficient way of depicting/displaying a representation of the indication to a user (as discussed below) and/or processing the representation (e.g. to determine whether a certain point of interest, such as a fuel/energy station can be reached).

Of course, other ways of representing the indication of where the mobile unit 110 can move to are possible.

Whilst FIG. 3 shows the step 310 as being performed after the iterative process (the preceding steps 306 and 308), it will be appreciated that the step 310 may be performed as part of the steps 306 and 308. In particular, the indication may be generated dynamically as more and more navigable elements are identified, without waiting (at the step 308) for the identification of navigable elements to finish—e.g. for indications (a)-(e) above, the list of edges/nodes may grow dynamically; for indication (f) above, the extremities may be updated as new navigable elements are identified; and for indication (g) above, the flags/arrays may be updated as new navigable elements are identified.

At an optional step 312, the system 200 may provide an output based on the indication generated at the step 310. This may comprise the navigation system 220 providing the indication to the client device 230 (or, indeed, to another system), for the client device 230 (or other system) to then provide the output; alternatively, this may comprise the navigation system 220 itself providing the output.

For example, the output may be a representation of the indication provided on a graphical user interface (e.g. of the client device 230), such as an indication provided to an operator of the mobile unit 110 (e.g. a driver or a passenger of a vehicle when the mobile unit 110 is a vehicle). For instance, a map may be displayed on the graphical user interface, and the indication of where the mobile unit 110 can move to may be represented on the map e.g. (a) by highlighting/indicating some or all of the navigable elements that can be traversed within the total movement budget $B_{Total}$, (either only fully traversed or fully or partially traversed); or (b) by overlaying/representing a polygon or other shape on the map, where the polygon/shape is generated based on the extremities of some or all of the routes that can be travelled by the mobile unit 110 within the total movement budget $B_{Total}$, e.g. coordinates for the squares shown in FIG. 1*b*; etc.; or (c) overlaying/representing the 2-dimensional array discussed above for indication (g) on the map. This is useful, for example, to be able to easily identify whether a given destination can be reached or to help make a more informed decision about where a journey may be made to. Likewise, being able to quickly provide such an indication (e.g. on the map) enables a driver of a vehicle to readily understand that a change that they have just made to their driving style has impacted on where they can reach (e.g. by changing to driving at a lower speed, or by turning off air-conditioning, the vehicle is more fuel/energy efficient, and therefore the vehicle can travel larger distances within the same fuel/energy total movement budget $B_{Total}$).

As another example, based on the indication of where the mobile unit 110 can move to, a selection of a destination within the geographical region may be made. For example, based on the indication of where the mobile unit 110 can move to, the navigation system 220 may determine that it is not possible to reach a planned destination and, therefore, a fuel/charging station needs to be visited along the way to the planned destination. Additionally or alternatively, a reachable fuel/charging station may be selected (e.g. by the navigation system 220) based on the indication of where the mobile unit 110 can move to. Of course, other destinations may be selected, based on the indication of where the mobile unit 110 can move to, and for other purposes. In response to receiving, based on the indication of where the mobile unit 110 can move to, a selection of a destination within the geographical region 100, the system 200 may provide/generate navigation instructions for moving the mobile unit 110 to the selected destination. Such instructions may be provided to an operator of the mobile unit 110 (e.g. a driver or a passenger of a vehicle when the mobile unit 110 is a vehicle). Likewise, the mobile unit 110 may be a vehicle comprising a driving system for autonomous driving of the vehicle, and the navigation instructions may be provided to the driving system for use by the driving system to control movement of the vehicle to the selected destination.

As mentioned, many techniques are currently known for carrying out the method 300, and they shall not be described in more detail herein—however, a comparison of such techniques can be found at https://digital-geography.com/comparing-isochrone-apis-an-insight-into-different-providers/, the entire disclosure of which is incorporated herein by reference. However, such techniques can often take an unacceptably large amount of time to complete (in the order of many minutes), whereas the target time for determining where the mobile unit 110 can move to may actually be in the order of a couple of seconds. Likewise, whilst some current techniques for performing this may be configured to complete quickly, the resulting estimates of where the mobile unit 110 can move to are usually inaccurate or are at a very low resolution and, therefore, they are of less use than desired. Embodiments of the invention address these issues.

For example: FIG. 7*a* has a representation (a shaded area 700 on a map) of an indication of where a mobile unit 110 can move to, where the indication is generated using a known technique; in contrast, FIG. 7*b* has a representation (a shaded area 710 on the map) of an indication of where a mobile unit 110 can move to, where this indication is generated using an embodiment of the invention (discussed below). Both indications were generated in substantially the same amount of time, and it is clear that the indication generated by an embodiment of the invention is more accurate and more detailed than the other indication. Viewed another way, being able to generate an indication as accurate and detailed as that shown in FIG. 7*b* would take known techniques a substantially larger amount of time than embodiments of the invention (discussed below).

Figure 7C:
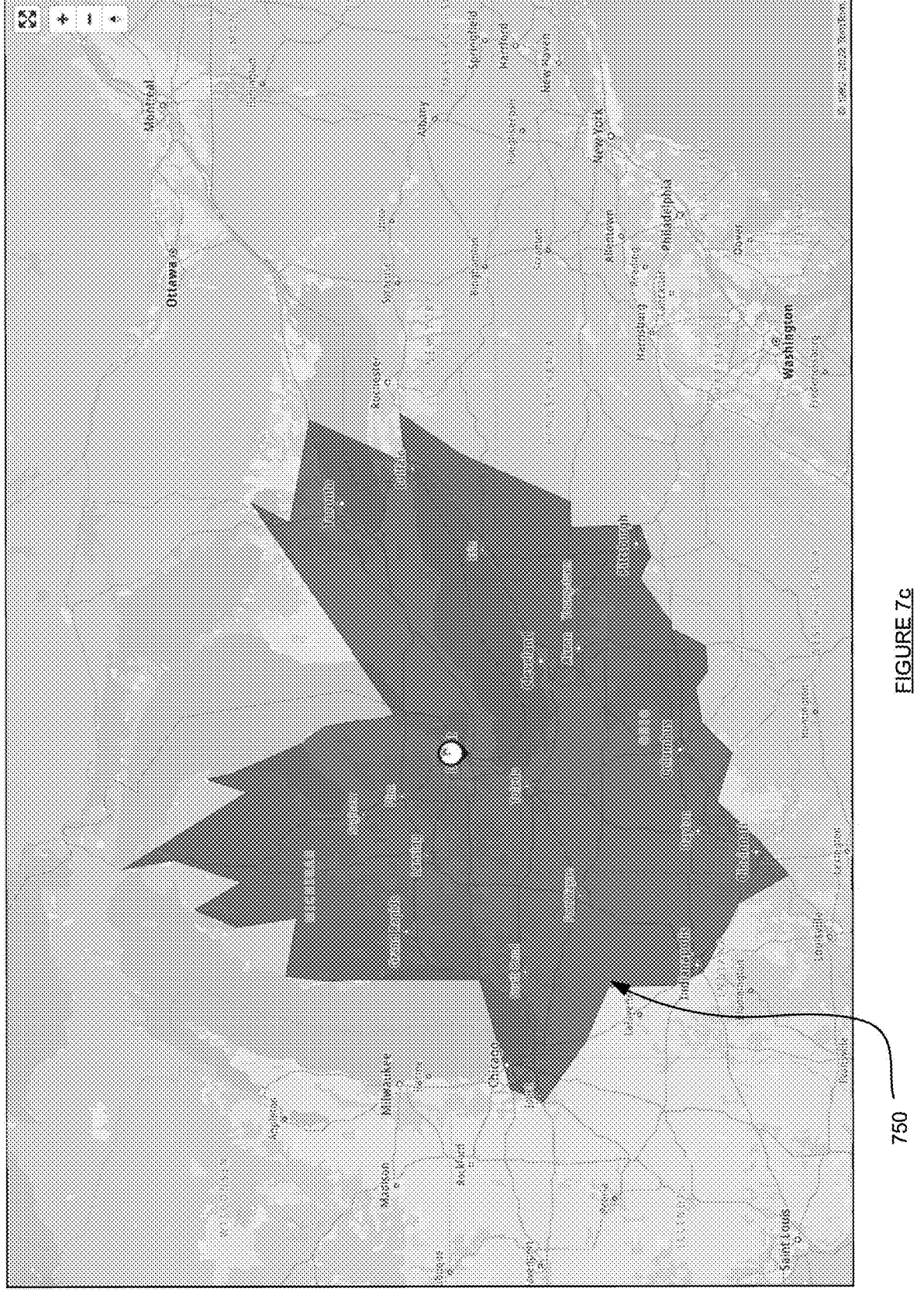
FIG. 7*c* shows another representation of an indication of where a mobile unit can move to, where the indication is generated using a known technique.
Figure 7D:
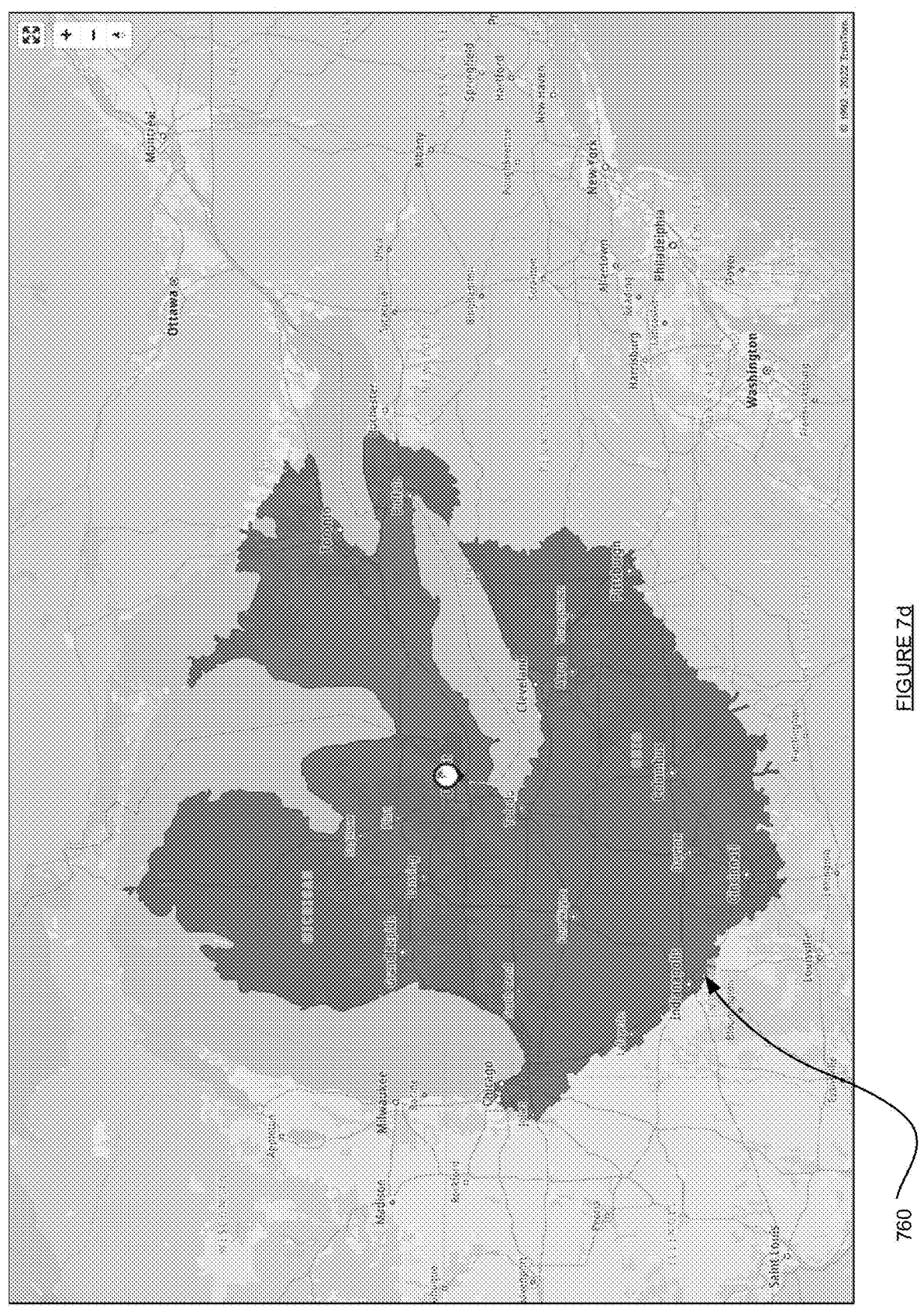
FIG. 7*d* shows another representation of an indication of where a mobile unit can move to, where this indication is generated using an embodiment of the invention.

As another example: FIG. 7*c* has a representation (a shaded area 750 on a map) of an indication of where a mobile unit 110 can move to, where the indication is generated using a known technique and using a larger total movement budget $B_{Total}$ than for FIGS. 7*a* and 7*b* (in particular, a total movement distance budget $B_{Total}$ of movement of at most 480 km); in contrast, FIG. 7*d* has a representation (a shaded area 760 on the map) of an indication of where a mobile unit 110 can move to, where this indication is generated using an embodiment of the invention (discussed below). Both indications were generated in substantially the same amount of time, and it is clear that the indication generated by an embodiment of the invention is more accurate and more detailed than the other indication. Viewed another way, being able to generate an indication as accurate and detailed as that shown in FIG. 7*d* would take known techniques a substantially larger amount of time than embodiments of the invention (discussed below).

Figure 6:
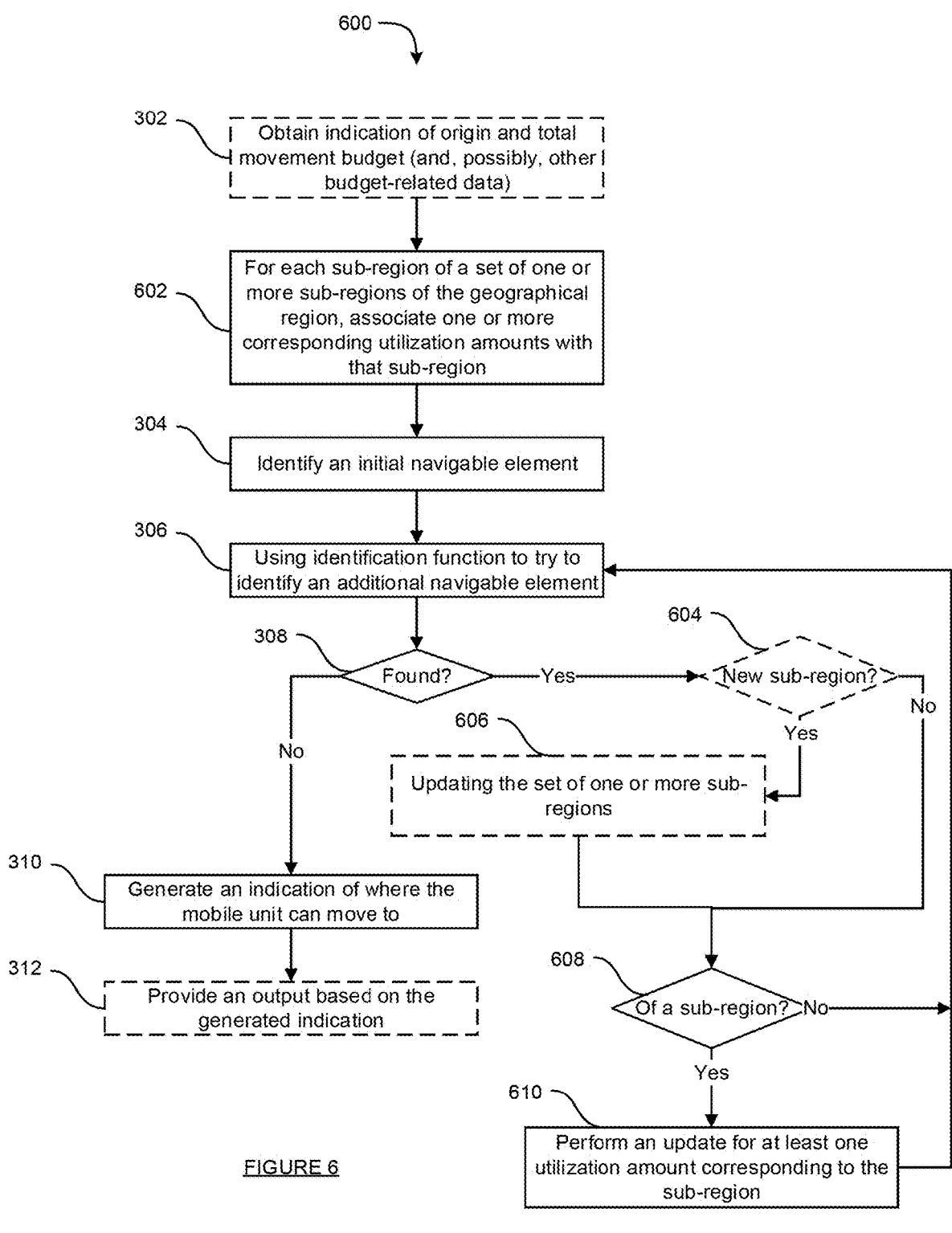
FIG. 6 is a flowchart illustrating a method that may be performed by the system of FIG. 2 according to some embodiments of the invention.

FIG. 6 is a flowchart illustrating a method 600 that may be performed by the system 200 of FIG. 2 according to some embodiments of the invention. This is the same as the method 300 of FIG. 3, except as discussed below—therefore, the steps that the method 300 and the method 600 have in common shall not be discussed in detail again.

As shall become apparent from the discussion below, the method 600 is based on there being a set of one or more sub-regions of the geographical region 100, where each of these sub-regions has one or more corresponding utilization amounts associated therewith. For each sub-region, its one or more utilization amounts are used to control when (and possibly how) the identification function $\mathcal{F}$ may start to ignore (or discount from selection at the step 306) one or more (or possibly all) further navigable elements within that sub-region. Due to the configuration and usage of the utilization value(s), this provides the benefits of: (a) the identification function $\mathcal{F}$ spending less time processing/considering navigable elements of that sub-region, with such navigable elements being unlikely to further/better develop the indication of where the mobile unit 110 can move to; and (b) the identification function $\mathcal{F}$ focusing more on navigable elements of other sub-regions, with such navigable elements being more likely to further/better develop the indication of where the mobile unit 110 can move to.

Thus, the method 600 comprises a step 602 at which, for each sub-region SR of a set of one or more sub-regions of the geographical region 100, one or more corresponding utilization amounts u are associated with that sub-region. Let there be $N_{SR}$ sub-regions in the set of one or more sub-regions, and let $SR_k$ be the $k^{th}$ sub-region (for $k=1, \ldots, N_{SR}$). For the $k^{th}$ sub-region $SR_k$ (for $k=1, \ldots, N_{SR}$), let there be $U_k$ utilization amounts $u_{k,j}$ (for $j=1, \ldots, U_k$) associated with that sub-region $SR_k$ (for some positive integer $U_k$). Thus, the navigation system 220 may be arranged to store $U_k$ utilization amounts $u_{k,j}$ (for $j=1, \ldots, U_k$) in association with the sub-region $SR_k$ (for $k=1, \ldots, N_{SR}$). In some embodiments, all sub-regions $SR_k$ (for $k=1, \ldots, N_{SR}$) use the same value for $U_k$; in some embodiments, two or more sub-regions $SR_k$ (for $k=1, \ldots, N_{SR}$) use different respective values for $U_k$ (for example, some utilization amounts may only be useful for sub-regions that are close to the specified origin whilst other utilization amounts may only be useful for sub-regions that are far from the specified origin, or when close to consumption of all of the total movement budget $B_{Total}$). Thus, in some embodiments, two or more sub-regions $SR_k$ (for $k=1, \ldots, N_{SR}$) may have different numbers of associated utilization amounts that represent different quantities.

The sub-regions are portions, or areas within/of, the geographical region 100. Preferably, the sub-regions are all of the same size, but this is not essential. Preferably, the sub-regions are all of the same shape (e.g. square, rectangle, etc.), but this is not essential. Preferably, none of the sub-regions overlap another of sub-regions, but this is not essential.

The set of $N_{SR}$ available sub-regions may be predetermined for the geographical region 100 (e.g. a predetermined partitioning or cover for the geographical region 100). In other embodiments, the method 600 may comprise a step (not shown in FIG. 6) at which the navigation system 220 identifies an initial sub-region based on the specified origin (e.g. so that the specified origin is contained within, e.g. at the centre of, the initial sub-region), with the locations of the other sub-regions then being determined by the navigation system 220 based on the location of the initial sub-region (e.g. so as to form a partitioning or cover for the geographical region 100 based on the initial sub-region).

In some embodiments, the navigation system 220 may identify $N_{SR}$ sub-regions that cover (or possibly partition) the entire geographical region 100, and associate the one or more corresponding utilization amounts with those $N_{SR}$ sub-regions before performing the sequence of steps to identify navigable elements.

Other embodiments may not start with such a complete set of sub-regions. For example, the set of $N_{SR}$ sub-regions may be initialized with one or more sub-regions located close to the specified origin (e.g. just one sub-region in which the origin is located). In such embodiments, when an additional navigable element has been identified at the step 306 (as determined at the step 308), then the method 600 may determine, at an optional step 604, whether one or more new sub-regions need to be used based on the newly-identified additional navigable element (e.g. if at least a part (e.g. the start or end) of, or if any part of, the identified additional navigable element is not contained by (or located in) the set of $N_{SR}$ sub-regions), and, in response to determining that one or more new sub-regions need to be used (e.g. in response to determining that at least a part (e.g. the start or end) of, or any part of, the identified additional navigable element is not contained by (or located in) the set of $N_{SR}$ sub-regions), processing may proceed to an optional step 606 at which the set of $N_{SR}$ sub-regions is updated by including one or more further sub-regions (e.g. so that the identified additional navigable element, or the start or end thereof, is contained by the set of $N_{SR}$ sub-regions). Thus, $N_{SR}$ would be increased, and each of the one or more further sub-regions would have one or more corresponding utilization amounts associated therewith. In this way, the set of $N_{SR}$ sub-regions may dynamically grow as more and more of the navigable elements of the network 105 are identified—this may help provide a more memory efficient implementation of the method 600. Processing then proceeds at a step 608. If, on the other hand, the steps 604 and 606 are not implemented, or if the determination at the step 604 is that no new sub-regions need to be used, then processing proceeds at the step 608.

It will, however, be appreciated that other methods are possible for initializing and maintaining the set of $N_{SR}$ sub-regions. Indeed, it is possible, in some embodiments, that certain locations within the geographical region 100 will not have a corresponding sub-region (for example, the method 600 may be arranged to not provide a sub-region that contains the specified origin, or to not provide a sub-region more than a certain distance away from the origin) so as to, in effect, implement the procedure of the method 300 in/around such locations.

For each sub-region $SR_k$ (for $k=1, \ldots, N_{SR}$), the method 600 may comprise initializing each of the corresponding $U_k$ utilization amounts $u_{k,j}$ (for $j=1, \ldots, U_k$) to a corresponding predetermined initial value. The predetermined initial values may be different for different utilization amounts $u_{k,j}$ (for $j=1, \ldots, U_k$) associated with the sub-region $SR_k$; alternatively, the predetermined initial values may be the same for all utilization amounts $u_{k,j}$ (for $j=1, \ldots, U_k$) associated with the sub-region $SR_k$. Likewise, different sub-regions may make use of different respective predetermined initial value(s) for their utilization amount(s) (e.g. the predetermined initial value(s) for a sub-region may be dependent on a distance between that sub-region and the specified origin); alternatively, the sub-regions may all make use of the same predetermined initial value(s) for their utilization amount(s).

As mentioned above, for each sub-region $SR_k$ (for $k=1, \ldots, N_{SR}$), its one or more corresponding utilization amounts $u_{k,j}$ (for $j=1, \ldots, U_k$) are used to control when (and possibly how) the identification function $\mathcal{F}$ may start to ignore one or more (or possibly all) further navigable elements located (at least partially) within that sub-region $SR_k$. Various different specific purposes/natures of the $U_k$ utilization amounts $u_{k,j}$ (for $j=1, \ldots, U_k$) associated with the sub-region $SR_k$ (for $k=1, \ldots, N_{SR}$) shall be discussed shortly. First, though, a discussion is set out below of how the utilization amounts are processed so as to provide this control.

As mentioned above, the step 608 is performed in response to an additional navigable element having been identified at the step 306 (as determined at the step 308). At the step 608, the navigation system 220 determines whether the identified additional navigable element is a navigable element of at least one sub-region $SR_k$, i.e. whether the identification function $\mathcal{F}$ has just (at the step 306) identified an additional navigable element of at least one sub-region $SR_k$. In some embodiments, the identified additional navigable element is a navigable element of the sub-region $SR_k$ (for $k=1, \ldots, N_{SR}$) if at least a part of that navigable element is located within the sub-region $SR_k$. In other embodiments, the identified additional navigable element is a navigable element of the sub-region $SR_k$ (for $k=1, \ldots, N_{SR}$) if a start of that navigable element is located within the sub-region $SR_k$ (or if an end of that navigable element is located within the sub-region $SR_k$, or if either the start or the end of that navigable element is located within the sub-region $SR_k$). It will be appreciated that embodiments of the invention may make use of other criteria for determining whether a navigable element is a navigable element of the sub-region $SR_k$ (for k=1, . . . , $N_{SR}$).

If the step 608 determines that the identification function $\mathcal{F}$ has identified an additional navigable element of at least one sub-region $SR_k$, then processing proceeds to a step 610; otherwise, processing returns to the step 306.

It will be appreciated that, in some embodiments of the invention, the identified additional navigable element will always be a navigable element of at least one sub-region $SR_k$, for example, if the set of $N_{SR}$ sub-regions $SR_k$ (for k=1, . . . , $N_{SR}$) provides a partition/cover for the entire geographical region 100 or if the step 606 of updating the set of $N_{SR}$ sub-regions $SR_k$ (for k=1, . . . , $N_{SR}$) inherently results in the additional navigable element being a navigable element of at least one sub-region $SR_k$. In such embodiments, the test at the step 608 may be omitted, so that processing would move straight to the step 610 instead.

At the step 610, the navigation system 220 performs an update for at least one utilization amount $u_{k,j}$ (for j=1, . . . , $U_k$) corresponding to a sub-region $SR_k$ for the identified additional navigable element, i.e. the navigation system 220 performs an update for at least one utilization amount $u_{k,j}$ corresponding to a sub-region $SR_k$ that the identified additional navigable element is a navigation element of. The update may be viewed as reflecting/representing that this additional navigable element has been "used" to help generate the indication of where the mobile unit 110 can move to. In some embodiments, the update is performed for only one such sub-region $SR_k$, such as a sub-region that contains the start or the end of the identified additional navigable element; in other embodiments, the update is performed for two or more (possibly all) such sub-regions. The nature of the update shall be described in more detail shortly. However, in summary, in response to the identification function $\mathcal{F}$ identifying an additional navigable element of at least one sub-region $SR_k$, the method 600 comprises performing (at the step 610) an update for at least one utilization amount $u_{k,j}$ corresponding to a sub-region $SR_k$ for the identified additional navigable element.

As discussed below, to help control when (and possibly how) the identification function $\mathcal{F}$ may start to ignore one or more (or possibly all) further navigable elements within the sub-region $SR_k$, the method 600 makes use of a predetermined threshold $T_{k,j}$ corresponding to the utilization amount $u_{k,j}$ (for k=1, . . . , $N_{SR}$ and j=1, . . . , $U_k$). The threshold $T_{k,j}$ may represent an upper bound for the utilization amount $u_{k,j}$, so that the utilization amount $u_{k,j}$ may be viewed as having passed the threshold $T_{k,j}$ if $u_{k,j}>T_{k,j}$ (or possibly if $u_{k,j}\geq T_{k,j}$). Alternatively, the threshold $T_{k,j}$ may represent a lower bound for the utilization amount $u_{k,j}$, so that the utilization amount $u_{k,j}$ may be viewed as having passed the threshold $T_{k,j}$ if $u_{k,j}>T_{k,j}$ (or possibly if $u_{k,j}\leq T_{k,j}$).

Performing the update for a utilization amount $u_{k,j}$ at the step 610 may comprise one of: (a) increasing the utilization amount $u_{k,j}$, where the corresponding predetermined threshold $T_{k,j}$ is greater than the corresponding predetermined initial value for the utilization amount $u_{k,j}$; (b) decreasing the utilization amount $u_{k,j}$, where the corresponding predetermined threshold $T_{k,j}$ is less than the corresponding predetermined initial value for the utilization amount $u_{k,j}$; (c) determining to leave the utilization amount $u_{k,j}$ unchanged (e.g. if the identified additional navigable element meets one or more particular criteria).

For the sub-region $SR_k$ (for k=1, . . . , $N_{SR}$), let $G_k$ be the (possibly-empty) group of utilization amounts $u_{k,j}$ associated with that sub-region $SR_k$ that have passed their corresponding threshold $T_{k,j}$. With the method 600, the identification function $\mathcal{F}$ is arranged so that, for each sub-region $SR_k$ (for k=1, . . . , $N_{SR}$) of the set of $N_{SR}$ sub-regions, the identification function $\mathcal{F}$ ignores (i.e. discounts from selection at the step 306) at least one of the unidentified navigable elements of that sub-region $SR_k$ if the corresponding group $G_k$ meets an ignore criterion. For example, the ignore criterion may be that the group $G_k$ has at least a predetermined number of elements (i.e. utilization amounts $u_{k,j}$). In some embodiments, this predetermined number is 1 (so that the identification function $\mathcal{F}$ is arranged to ignore at least one of the unidentified navigable elements of the sub-region $SR_k$ (for k=1, . . . , $N_{SR}$) if at least one of the utilization amounts $u_{k,j}$ corresponding to that sub-region $SR_k$ has passed its corresponding predetermined threshold $T_{k,j}$).

In summary, therefore, the identification function $\mathcal{F}$ is, at least in part, arranged to consider the geographical region 100 based on the sub-regions $SR_k$ (for k=1, . . . , $N_{SR}$) for the geographical region 100. The identification function $\mathcal{F}$ is arranged to ignore one or more (or, possibly, one or more types of) navigable elements in the sub-region $SR_k$ (for k=1, . . . , $N_{SR}$) in response to an ignore criterion being met by the group $G_k$ (i.e. the group of utilization amounts $u_{k,j}$ (j=1, . . . , $U_k$) for that sub-region $SR_k$ that have passed their corresponding predetermined threshold $T_{k,j}$). If the identification function $\mathcal{F}$ identifies an additional navigable element, then an update is performed for at least one of the utilization amounts $u_{k,j}$ for one or more of the sub-regions $SR_k$ (for k=1, . . . , $N_{SR}$) for that navigable element. In this way, if the identification function $\mathcal{F}$ identifies an additional navigable element, then the updating of a utilization amount $u_{k,j}$ is likely to bring that utilization amount $u_{k,j}$ closer to its corresponding predetermined threshold $T_{k,j}$, meaning that the identification function $\mathcal{F}$ should, at some point, start ignoring one or more navigable elements due to the ignore criterion being met. This then helps the navigation system 220 more quickly finish its determination of where the mobile unit 110 can move to within the network 105.

As can be seen from FIG. 6, the method 600 comprises performing a sequence of steps, wherein each step comprises: (a) using (at the step 306) the identification function $\mathcal{F}$ to try to identify an additional navigable element, wherein the additional navigable element is a neighbour of an already-identified navigable element and can be reached by the mobile unit 110 from the origin in accordance with the total movement budget $B_{Total}$; and (b) in response to the identification function $\mathcal{F}$ identifying an additional navigable element of at least one sub-region, performing (at the step 610) an update for at least one utilization amount corresponding to a sub-region for the identified additional navigable element.

Now, in some embodiments, for one or more (or possibly all) sub-regions $SR_k$ (for k=1, . . . , $N_{SR}$), the identification function $\mathcal{F}$ may be arranged to not ignore any unidentified navigable elements of that sub-region $SR_k$ that satisfy one or more predetermined criteria, i.e. even if the ignore criterion has been met by the group $G_k$, such navigable elements may be considered for selection by the identification function $\mathcal{F}$. For example, certain navigable elements (that meet a particular predetermined criterion) may be considered to be sufficiently important (e.g. important for consideration for exploring the geographical region 100 and/or for quickly moving away from the specified origin) that the identification function $\mathcal{F}$ should never ignore such navigable elements, since such navigable elements may help the navigation system 220 more quickly finish an accurate determination of where the mobile unit 110 can move to within the network 105. For example, the identification function $\mathcal{F}$ may be arranged to not ignore any unidentified navigable elements that are motorways (or parts thereof).

Alternatively, for each sub-region $SR_k$ (for k=1, . . . , $N_{SR}$) of the set of $N_{SR}$ sub-regions, the identification function $\mathcal{F}$ may be arranged to ignore all (or any more) of the unidentified navigable elements of that sub-region $SR_k$ if the group $G_k$ meets the ignore criterion.

In some embodiments, the ignore criterion specifies that the group $G_k$ comprises at least a predetermined number of utilization amounts—thus, the identification function $\mathcal{F}$ may be arranged to ignore one or more of the unidentified navigable elements of the sub-region $SR_k$ (for k=1, . . . , $N_{SR}$) if at least that predetermined number of utilization amounts $u_{k,j}$ for the sub-region $SR_k$ have passed their threshold. In some embodiments, this predetermined number of utilization amounts is 1, although it may be higher and may vary from one sub-region to the next. Additionally or alternatively, in some embodiments the ignore criterion specifies that the group $G_k$ comprises one or more specific utilization amounts—thus, the identification function $\mathcal{F}$ may be arranged to ignore one or more of the unidentified navigable elements of the sub-region $SR_k$ (for k=1, . . . , $N_{SR}$) if any one of those particular utilization amounts $u_{k,j}$ for the sub-region $SR_k$ have passed their threshold. Additionally or alternatively, in some embodiments the ignore criterion specifies a criterion based on some other function of one or more (or possibly all) of the utilization amounts $u_{k,j}$ for the sub-region $SR_k$ (j=1, . . . , $U_k$), e.g. if a sum of one or more (or possibly all) of the utilization amounts $u_{k,j}$ for the sub-region $SR_k$ (j=1, . . . , $U_k$) exceeds a predetermined threshold. The ignore criterion may vary from one sub-region to another, or may be the same for each sub-region.

As a first example, in some embodiments of the invention, for each sub-region $SR_k$ (for k=1, . . . , $N_{SR}$), one utilization amount associated with that sub-region $SR_k$ may be used as a counter for the number of navigable elements of the sub-region $SR_k$ that have been identified so far by the identification function $\mathcal{F}$. Let $u_{k,c}$ denote this particular utilization amount for each sub-region $SR_k$ (for k=1, . . . , $N_{SR}$). Now, $u_{k,c}$ may be initialized to be 0 and, in this example, performing an update for the utilization amount $u_{k,c}$ comprises incrementing that utilization amount $u_{k,c}$ by 1. The threshold $T_{k,c}$ may be set to be an upper bound on the number of navigable elements of the sub-region $SR_k$ that the identification function $\mathcal{F}$ should identify, say 40. The ignore criterion for the sub-region $SR_k$ may specify that the group $G_k$ is of size 1 and/or that the group $G_k$ contains the utilization amount $u_{k,c}$. Thus, once the identification function $\mathcal{F}$ has identified $T_{k,c}$ navigable elements of the sub-region $SR_k$, the utilization amount $u_{k,c}$ may be viewed as having passed the threshold $T_{k,c}$ and the ignore criterion will have been met for the sub-region $SR_k$. Therefore, the identification function $\mathcal{F}$ will now ignore one or more of the remaining unidentified navigable elements of the sub-region $SR_k$. By limiting the identification function $\mathcal{F}$ to only select at most $T_{k,c}$ navigable elements of the sub-region $SR_k$, the method 600 does not waste time checking for additional navigable elements in the sub-region $SR_k$—further navigable elements of the sub-region $SR_k$ are unlikely to further/better develop the indication of where the mobile unit 110 can move to, whereas enabling the method 600 to focus processing time on checking for additional navigable elements in other sub-regions helps the method 600 to more quickly further/better identify where the mobile unit 110 can move to. Put another way, the method 600 can more quickly branch out from, or explore away from, the currently explored parts of the geographical region 100, whilst maintaining high accuracy within explored parts of the geographical region 100.

It will be appreciated that the above example embodiment may be implemented instead by: initializing the utilization amount $u_{k,c}$ to be 40; arranging performance of the update for the utilization amount $u_{k,c}$ to comprise decrementing that utilization amount $u_{k,c}$ by 1; and setting the threshold $T_{k,c}$ to 0.

Of course, other ways of achieving the same result may be implemented by different settings for embodiments of the invention.

As a second example, in some embodiments of the invention, for each sub-region $SR_k$ (for k=1, . . . , $N_{SR}$), one utilization amount associated with that sub-region $SR_k$ may be used as an indication of a length (or distance) for the navigable elements of the sub-region $SR_k$ that have been identified so far by the identification function $\mathcal{F}$. Let $u_{k,d}$ denote this particular utilization amount for each sub-region $SR_k$ (for k=1, . . . , $N_{SR}$). Now, $u_{k,d}$ may be initialized to be 0 and, in this example, performing an update for the utilization amount $u_{k,d}$ comprises adjusting the utilization amount $u_{k,d}$ in accordance with an amount having a magnitude dependent on a length L of the identified additional navigable element. Here, the magnitude dependent on the length L increases monotonically according to increasing length. In some embodiments, the length L may be taken to be the entire length of the navigable element, or may be taken to be the length of the part(s) of the navigable element contained within the sub-region $SR_k$, or may be taken to be some other length for the navigable element. The magnitude dependent on the length L may simply be the length L of the navigable element. However, in some embodiments, there may be different categories for different lengths (e.g. category 1 for if L<50 m; category 2 for 50 m≤L<500 m; category 3 for L≥500 m), and the magnitude may be based on the category (e.g. magnitude=0 for category 1; magnitude=1 for category 2; magnitude=3 for category 3). The threshold $T_{k,d}$ may be set to be an upper bound on the combined length for the navigable elements of the sub-region $SR_k$ that the identification function $\mathcal{F}$ identifies. The ignore criterion for the sub-region $SR_k$ may specify that the group $G_k$ is of size 1 and/or that the group $G_k$ contains the utilization amount $u_{k,d}$. Thus, once the identification function $\mathcal{F}$ has identified sufficient navigable elements of the sub-region $SR_k$ so that their combined length measure is $T_{k,d}$ or more, then the utilization amount $u_{k,d}$ may be viewed as having passed the threshold $T_{k,d}$ and the ignore criterion will have been met for the sub-region $SR_k$. Therefore, the identification function $\mathcal{F}$ will now ignore one or more of the remaining unidentified navigable elements of the sub-region $SR_k$. By limiting the identification function $\mathcal{F}$ to stop selecting one or more navigable elements once a threshold distance/length $T_{k,d}$ for the currently-selected navigable elements of the sub-region $SR_k$ has been met or exceeded, the method 600 does not waste time checking for additional navigable elements in the sub-region $SR_k$—further navigable elements of the sub-region $SR_k$ are unlikely to further/better develop the indication of where the mobile unit 110 can move to, whereas enabling the method 600 to focus processing time on checking for additional navigable elements in other sub-regions helps the method 600 to more quickly further/better identify where the mobile unit 110 can move to. Put another way, a sufficient distance within the sub-region $SR_k$ may be considered to have been explored to enable the method 600 to quickly branch out from, or explore away from, the currently explored parts of the geographical region 100, whilst maintaining high accuracy within explored parts of the geographical region 100.

This second example (based on accumulated distance/length of navigable elements) may provide for better stability or applicability than the first example (based on counting navigable elements), e.g. the resulting quality for the generated indication may be more stable across different maps. For example, a first map $M_1$ might have a lot of intermediate nodes (i.e. nodes connected to exactly two edges) along a navigable element that is represented by just one edge in another map $M_2$ for the same geographical region. When counting edges (navigable elements) as per the first example, the threshold may be reached quickly (distance-wise) on the map $M_1$, or at least be reached in a different manner than for the map $M_2$, whereas basing the processing based on accumulated distance/length of navigable elements, as per this second example, will exhibit less variance between maps $M_1$ and $M_2$.

Again, it will be appreciated that the above example embodiment may be implemented by: initializing the utilization amount $u_{k,d}$ to be a maximum length indication; arranging performance of the update for the utilization amount $u_{k,d}$ to comprise decrementing that utilization amount $u_{k,d}$ by the magnitude dependent on the length L; and setting the threshold $T_{k,d}$ to 0.

Of course, other ways of achieving the same result may be implemented by different settings for embodiments of the invention.

As a third example, in some embodiments, the identification function $\mathcal{F}$ and/or the update that is performed for a utilization amount $u_{k,j}$ may be based, at least in part, on a classification (or type of categorization), from a predetermined set of classifications, associated with the identified additional navigable element, wherein the classifications in the predetermined set of classifications are ranked such that a first navigable element having a higher ranked classification than a second navigable element is indicative of the first navigable element being more likely than the second navigable element to be: (a) used for route planning; and/or (b) of importance or utility for transit through the geographical region 110. Such a classification value for a navigable element may be stored as data in association with the navigable element within the database 212 (and accessed by the navigation system 220 when performing the method 600). For example, the Navigation Data Standard (see https://en.wikipedia.org/wiki/Navigation_Data_Standard, the entire disclosure of which is incorporated herein by reference), has provision for specifying such classifications as part of the format for a navigation/map database 212. The predetermined set of classifications could be, for example, a set of FRC (functional road class) values, as specified in the Navigation Data Standard (where an FRC value indicates an importance of a road for long distance routes and may range, for example, from 0 (most important) to 7 (least important)).

The predetermined set of classifications will have been generated prior to the execution of the method 600 (e.g. by the provider of the map database 212), i.e. as a process separate from the method 600. There are many ways of generating such a predetermined set of classifications, and this generation could be based on a variety of factors. The generation could be based on data in the map database 212 (e.g. length of navigable elements, speed limits or average speeds on navigable elements, etc.). For example: (i) the predetermined set of classifications may correspond to a length of the navigable element, with a classification $C_a$ that is lower in rank than a classification $C_b$ indicating that a navigation element of classification $C_a$ is shorter than a navigation element of classification $C_b$; (ii) the predetermined set of classifications may correspond to a maximum allowable speed (if any) for the navigable element, with a classification $C_a$ that is lower in rank than a classification $C_b$ indicating that travel along a navigation element of classification $C_a$ cannot go as quickly as travel along a navigation element of classification $C_b$; (iii) there are generally different types of navigable element, and some are more useful (on average, over a set of desired/expected routes through the geographical region 100) for route planning or transit through the geographical region 110 (e.g. motorways may be classified as more useful than dual-carriage ways; dual-carriage ways may be classified as more useful than single-lane roads connecting residential areas; single-lane roads connecting residential areas may be classified as more useful than roads within a residential area; etc.); (iv) such a set of classifications may be derived, for example, based on data from one or more municipalities responsible for the network 105 (e.g. maintenance cost, an "administrative class" (or importance) attributed by the municipality to a navigable element, etc.) or other data (e.g. name of the navigable element, such as an "M-road" being of a higher-ranked classification than an "A-road"; an "A-road" being of a higher-ranked classification than a "B-road"; a "B-road" being of a higher-ranked classification than a "C-road"; etc.; (v) etc. Having the identification function $\mathcal{F}$ and/or the update that is performed for a utilization amount $u_{k,j}$ based, at least in part, on a classification associated with the identified additional navigable element may be achieved in a variety of ways.

In the following, let there be $N_C$ classifications $C_j$ (for $j=0, \ldots, N_C-1$) in the predetermined set of classifications, where $C_j > C_{j+1}$ (for $j=0, \ldots, N_C-2$).

One example use of the classification associated with the identified additional navigable element may be viewed as a variant of the first or second example set out above. In particular, performing an update for a utilization amount $u_{k,j}$ may comprise adjusting the utilization amount $u_{k,j}$ in accordance with an amount having a magnitude dependent on the classification of the identified additional navigable element. With such a variant, the magnitude dependent on the classification of the identified additional navigable element changes monotonically according to increasing classification rank. Such an approach may be used to set, or to scale, the update applied to the utilization amount $u_{k,j}$ in any of the above examples. For example, if the classification for a navigable element is in the range $C_0$ to $C_W$ (for some $0 \leq W < N_C-1$) then the update to the utilization amount $u_{k,c}$ (for the first example discussed above applied) may be 2, whereas if the classification for a navigable element is in the range $C_{W+1}$ to $C_{N_C-1}$ then the update to the utilization amount $u_{k,c}$ may be 1. As another example, if the classification for a navigable element is $C_w$ (for some $0 \leq w \leq N_C-1$) then the update to the utilization amount $u_{k,c}$ (for the first example discussed above applied) may be w. As another example, if the classification for a navigable element is in the range $C_0$ to $C_W$ (for some $0 \leq W < N_C-1$) then the update to the utilization amount $u_{k,d}$ (for the second example discussed above applied) may be the length L for the navigable element, whereas if the classification for a navigable element is in the range $C_{W+1}$ to $C_{N_C-1}$ then the update to the utilization amount $u_{k,d}$ may be $\alpha L$ (for some $0 \leq \alpha < 1$). Other examples are clearly possible. By adjusting how the update is performed based on classification for the identified additional navigable element, the identification function $\mathcal{F}$ may stop selecting one or more navigable elements once sufficient navigable elements of a certain type have been identified, so that the method 600 does not waste time checking for additional navigable elements in the sub-region $SR_k$—further navigable elements of the sub-region $SR_k$ are unlikely to further/better develop the indication of where the mobile unit 110 can move to, whereas enabling the method 600 to focus processing time on checking for additional navigable elements in other sub-regions helps the method 600 to more quickly further/better identify where the mobile unit 110 can move to. Put another way, a sufficient number of useful navigable elements within the sub-region $SR_k$ may be considered to have been explored to enable the method 600 to quickly branch out from, or explore away from, the currently explored parts of the geographical region 100, whilst maintaining high accuracy within explored parts of the geographical region 100.

As an additional or alternative example use of the classification associated with the identified additional navigable element, for at least one sub-region $SR_k$ (for k=1, . . . , $N_{SR}$) of the set of $N_{SR}$ sub-regions, a corresponding subset $H_k$ of the predetermined set of classifications $\{C_j: j=0, . . . , N_C-1\}$ may be associated with that sub-region $SR_k$. The identification function $\mathcal{F}$ may be arranged to ignore unidentified navigable elements of the sub-region $SR_k$ having a classification in the corresponding subset $H_k$. For example, the subset $H_k$ may comprise one or more of the lowest-ranked classifications, e.g. $H_k=\{C_j: j=W_k, . . . , N_C-1\}$ for some $0<W_k\leq N_C-1$. With such a subset $H_k$, the method 600 does not waste time checking for navigable elements in the sub-region $SR_k$ that are unlikely to be of assistance for generating the indication of where the mobile unit 110 can move to—instead, the method 600 can focus processing time on selecting navigable elements of sufficiently high classification (and therefore updating utilization values based on such navigable elements with sufficiently high classification).

It will be appreciated, of course, that the navigable elements of one sub-region may have a completely different range of classifications from the set of predetermined classifications for the navigable elements of another sub-region: for example, one sub-region may only comprise a motorway (e.g. of a high-rank classification) whereas another sub-region may only comprise local residential roads (e.g. of a low-rank classification). The subset $H_k$ associated with the sub-region $SR_k$ may, therefore, be set based on the navigable elements of that sub-region $SR_k$.

One option, therefore, for basing the subset $H_k$ associated with the sub-region $SR_k$ on the navigable elements of that sub-region $SR_k$ would be for the navigation system 220 to process all of the navigable elements of that sub-region $SR_k$ to identify the range of classifications for the navigable elements of that sub-region $SR_k$ and then set the subset $H_k$ accordingly (e.g. to comprise all such identified classifications except for a number, e.g. 1 or 2, of the highest ranked classifications from that range, so that the method 600 only focusses on navigable elements of such highest ranked classifications from that sub-region $SR_k$). However, processing all of the navigable elements of that sub-region $SR_k$ to identify the range of classifications for the navigable elements of that sub-region $SR_k$ may involve a substantial amount of processing.

Therefore, as an alternative option for basing the subset $H_k$ associated with the sub-region $SR_k$ on the navigable elements of that sub-region $SR_k$, the method 600 may comprise updating the subset $H_k$ dynamically, namely by updating the subset $H_k$ corresponding to the sub-region $SR_k$ for the additional navigable element (identified at the step 306) in response to this navigable element satisfying an update criterion. This update criterion may take a variety of forms. For example, the update criterion may comprise the classification rank for the identified additional navigable element being higher than the classification rank of any already-identified navigable elements of the sub-region $SR_k$ for the identified additional navigable element. For example, if the highest ranked classification of navigable element so far identified for the sub-region $SR_k$ is $C_{Z_k}$ for some $0\leq Z_k\leq N_C-1$ then one might set $H_k=\{C_j: j=Z_k+\beta, . . . N_C-1\}$ for some positive integer $\beta$, i.e. the subset $H_k$ comprises zero or more classifications of lower rank than the highest classification rank of any already-identified navigable elements of the corresponding sub-region $SR_k$. Preferably, $\beta=2$ (so that the identification function $\mathcal{F}$ ignores navigable elements that are of classification $C_{Z_k+2}$ or lower).

In some embodiments, in response to updating the subset $H_k$ corresponding to the sub-region $SR_k$ for the additional navigable element identified at the step 306, at least one utilization amount $u_{k,j}$ corresponding to the sub-region $SR_k$ may be adjusted accordingly. For, the identification of a higher-ranked navigable element may be considered to warrant a sufficient amount of further exploration of the sub-region $SR_k$—however, if a utilization amount $u_{k,j}$ is close to its threshold $T_{k,j}$, then the identification function $\mathcal{F}$ may soon stop selecting one or more navigable elements for the sub-region $SR_k$. Adjustment of the utilization amount(s) $u_{k,j}$ would therefore be useful. Thus, in some embodiments, in response to updating the subset $H_k$ corresponding to the sub-region $SR_k$ for the additional navigable element identified at the step 306, at least one utilization amount $u_{k,j}$ corresponding to the sub-region $SR_k$ may be set to a value in a range bounded by the corresponding predetermined initial value for that utilization amount $u_{k,j}$ (i.e. a complete reinitialization) and a current value of said utilization amount. For example, the utilization amount $u_{k,j}$ may be moved away from its threshold $T_{k,j}$ by a predetermined amount, or may be scaled by a predetermined amount (e.g. halved), etc.

As an additional or alternative example use of the classification associated with the identified additional navigable element, for each sub-region $SR_k$ (for k=1, . . . , $N_{SR}$) of the set of $N_{SR}$ sub-regions, the one or more corresponding utilization amounts $u_{k,j}$ (j=1, . . . , $U_k$) comprise a utilization amount for at least one classification of the predetermined set of classifications. Thus, the above-mentioned examples based on utilization amounts $u_{k,j}$ (j=1, . . . , $U_k$) may be implemented on a classification-by-classification basis. Performing the update at the step 610 may therefore comprise updating the utilization amount that corresponds to the classification of the identified additional navigable element (the update being performed, for example, in line with one or more of the above-discussed examples). Moreover, in some such embodiments, the identification function $\mathcal{F}$ may be arranged to ignore the navigable elements of the sub-region $SR_k$ (for k=1, . . . , $N_{SR}$) of a given classification if a corresponding utilization amount for that sub-region $SR_k$ and for the given classification has passed its corresponding predetermined threshold.

As a variant of any of the above examples, performing an update for a utilization amount $u_{k,j}$ may comprise adjusting the utilization amount $u_{k,j}$ in accordance with an amount having a magnitude dependent on the number of sub-regions that contain at least a part of the identified additional navigable element, i.e. a magnitude based on how many sub-regions the identified additional navigable element is (at least in part) located in. With such a variant, the magnitude dependent on the number of sub-regions that contain at least a part of the identified additional navigable element increases monotonically according to the number of sub-regions that contain at least a part of the identified additional navigable element. For example, if the number of sub-regions that contain at least a part of the identified additional navigable element is a first predetermined value (such as 1) then the update to the utilization amount $u_{k,c}$ (for the first example discussed above applied) may be a first predetermined magnitude value (such as 0 or 1), and otherwise the update may be a second magnitude value (such as 10) that is greater than the first magnitude predetermined value. As another example, if the number of sub-regions that contain at least a part of the identified additional navigable element is at most a first predetermined value (such as 1 or 2) then the update to the utilization amount $u_{k,d}$ (for the second example discussed above applied) may be the length 0 for the navigable element, otherwise the update to the utilization amount $u_{k,d}$ may be the length L. Other examples are clearly possible. By adjusting how the update is performed based on the number of sub-regions that contain at least a part of the identified additional navigable element, the identification function $\mathcal{F}$ may stop selecting one or more navigable elements once sufficient navigable elements useful for exploring the geographical region 100 have been identified. Notably, using navigable elements that cross a boundary between sub-regions is more likely to more quickly explore the geographical 100, and so once a sufficient number of such navigable elements have been identified, the method 600 does not waste time checking for additional navigable elements in the sub-region $SR_k$—further navigable elements of the sub-region $SR_k$ are unlikely to further/better develop the indication of where the mobile unit 110 can move to, whereas enabling the method 600 to focus processing time on checking for additional navigable elements in other sub-regions helps the method 600 to more quickly further/better identify where the mobile unit 110 can move to.

It will be appreciated that each of the various examples (and variants thereof) set out above for usage/purpose of utilization amounts may be implemented with, or without, one or more of the other examples.

Whilst the optional steps 604 and 606 are shown in FIG. 6 as being performed before the steps 608 and 610, they could equally be performed after the steps 608 and 610 instead.

It will be appreciated that various factors affect the accuracy and execution time of method 600 relative to standard techniques that perform the method 300. These factors include: the size/shape of the sub-regions $SR_k$ (for k=1, ..., $N_{SR}$); the set of navigable elements for the network 105; which utilization value(s) $u_{k,j}$ (j=1, ..., $U_k$) are used; and the corresponding thresholds $T_{k,j}$ (j=1, ..., $U_k$). For example, using (a) a commercial database for route planning and navigation as the database 212 to represent the navigable elements for the network 105, (b) sub-regions $SR_k$ (for k=1, ..., $N_{SR}$) that are square and with sides of 900 m, (c) only one utilization value $u_{k,c}$ for each sub-region $SR_k$ (for k=1, ..., $N_{SR}$), with this being initialized at 0 and updated by incrementing by 1 if the identified navigable element starts in that sub-region $SR_k$ (i.e. based only on the above-discussed first example), then a threshold value $T_{k,c}$ of 30 provides a highly accurate indication of where the mobile unit 110 can move to relative to that provided by the method 300, and (when the specified total movement budget $B_{Total}$ is based on a full tank of fuel or battery charge for a vehicle) completes execution much quicker (in a matter of seconds) than the method 300 (which takes minutes to complete). As another example, using (a) a commercial database for route planning and navigation as the database 212 to represent the navigable elements for the network 105, (b) sub-regions $SR_k$ (for k=1, ..., $N_{SR}$) that are square and with sides of 900 m, (c) only one utilization value u kc for each sub-region $SR_k$ (for k=1, ..., $N_{SR}$), with this being initialized at 0 and updated by either incrementing by 1 if a navigable element starts in that sub-region $SR_k$ and is within multiple sub-regions or by 0 (i.e. not changing) if the navigable element is within just one sub-region, then a threshold value $T_{k,c}$ of 4 provides a highly accurate indication of where the mobile unit 110 can move to relative to that provided by the method 300, and (when the specified total movement budget $B_{Total}$ is based on a full tank of fuel or battery charge for a vehicle) completes execution much quicker (in a matter of seconds) than the method 300 (which takes minutes to complete). As a further example, using (a) a commercial database for route planning and navigation as the database 212 to represent the navigable elements for the network 105, (b) sub-regions $SR_k$ (for k=1, ..., $N_{SR}$) that are square and with sides of 900 m, (c) only one utilization value $u_{k,c}$ for each sub-region $SR_k$ (for k=1, ..., $N_{SR}$), with this being initialized at 0, updated by incrementing by 1 if the identified navigable element starts in that sub-region $SR_k$ and is contained entirely in that sub-region $SR_k$, and updated by incrementing by 10 if the identified navigable element starts in that sub-region $SR_k$ and is contained in more than one sub-region, (d) a predetermined set of classifications (8 FRC values) and the dynamically updated subsets $H_k$ with β=2 as discussed above, then a threshold value $T_{k,c}$ of 50 provides a highly accurate indication of where the mobile unit 110 can move to relative to that provided by the method 300, and (when the specified total movement budget $B_{Total}$ is based on a full tank of fuel or battery charge for a vehicle) completes execution much quicker (in a matter of seconds) than the method 300 (which takes minutes to complete). The skilled person will, of course, be able to set such factors according to their specific performance requirements—for example, based on the database 212 that they have available, the skilled person may readily test a variety of sizes/shapes of the sub-regions $SR_k$ (for k=1, ..., $N_{SR}$) and thresholds $T_{k,j}$ (j=1, ..., $U_k$) for utilization value(s) $u_{k,j}$ (j=1, ..., $U_k$) to suit their purpose.

Figure 8:
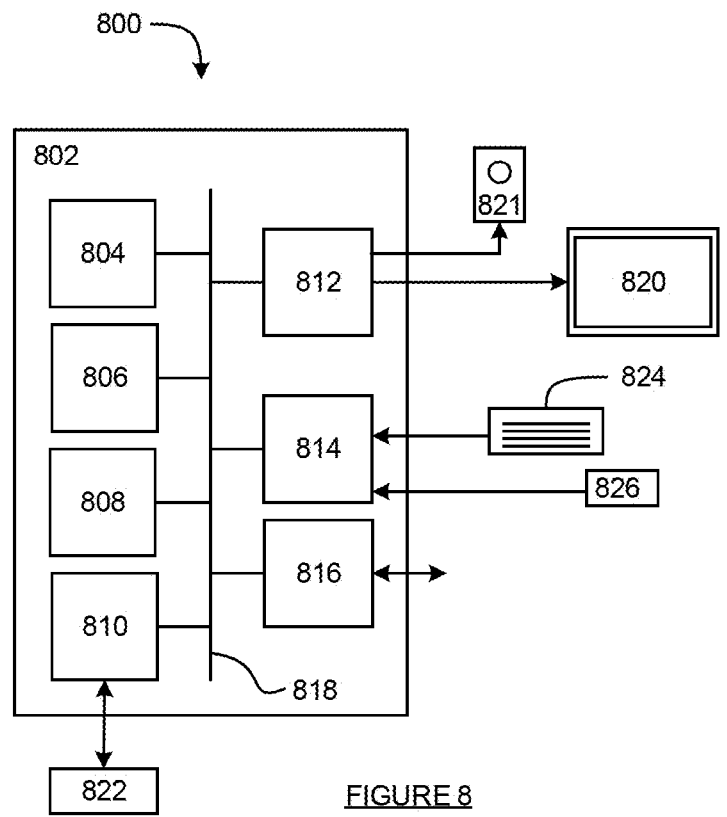
FIG. 8 schematically illustrates an example of a computer system.

The database system 210, the client device 230 and the navigation system 220 may be implemented together, or separately, as one or more of the computer systems, such as the computer system 800 illustrated schematically in FIG. 8. The system 800 comprises a computer 802. The computer 802 comprises: a storage medium 804, a memory 806, a processor 808, a device interface 810, a user output interface 812, a user input interface 814 and a network interface 816. Each of these components may be arranged to communicate with one or more of the other components via one or more communication buses 818 of the computer 802.

The storage medium 804 may be any form of non-volatile data storage device such as one or more of a hard disk drive, a magnetic disc, a solid-state-storage device, an optical disc, a ROM, etc. The storage medium 804 may store an operating system for the processor 808 to execute in order for the computer 802 to function. The storage medium 804 may also store one or more computer programs (or software or instructions or code).

The memory 806 may be any random access memory (storage unit or volatile storage medium) suitable for storing data and/or computer programs (or software or instructions or code).

The processor 808 may be any data processing unit suitable for executing one or more computer programs (such as those stored on the storage medium 804 and/or in the memory 806), some of which may be computer programs according to embodiments of the invention or computer programs that, when executed by the processor 808, cause the processor 808 to carry out a method according to an embodiment of the invention and configure the system 800 to be a system according to an embodiment of the invention. The processor 808 may comprise a single data processing unit or multiple data processing units operating in parallel, separately or in cooperation with each other. The processor 808, in carrying out data processing operations for embodiments of the invention, may store data to and/or read data from the storage medium 804 and/or the memory 806.

The device interface 810 may be any unit for providing an interface to a device 822 external to, or removable from, the computer 802. The device 822 may be a data storage device, such as one or more of an optical disc, a magnetic disc, a solid-state-storage device, etc. The device 822 may have processing capabilities—for example, the device may be a smart card. The interface 810 may therefore access data from, or provide data to, or interface with, the device 822 in accordance with one or more commands that it receives from the processor 808.

The user input interface 814 is arranged to receive input from a user, or operator, of the system 800. The user may provide this input via one or more input devices of the system 800, such as a mouse (or other pointing device) 826 and/or a keyboard 824, that are connected to, or in communication with, the user input interface 814. However, it will be appreciated that the user may provide input to the computer 802 via one or more additional or alternative input devices (such as a touch screen). The computer 802 may store the input received from the input devices via the user input interface 814 in the memory 806 for the processor 808 to subsequently access and process, or may pass it straight to the processor 808, so that the processor 808 can respond to the user input accordingly.

The user output interface 812 is arranged to provide a graphical/visual and/or audio output to a user, or operator, of the system 800. As such, the processor 808 may be arranged to instruct the user output interface 812 to form an image/video signal representing a desired graphical output, and to provide this signal to a monitor (or screen or display unit) 820 of the system 800 that is connected to the user output interface 812. Additionally or alternatively, the processor 808 may be arranged to instruct the user output interface 812 to form an audio signal representing a desired audio output, and to provide this signal to one or more speakers 821 of the system 800 connected to the user output interface 812.

Finally, the network interface 816 provides functionality for the computer 802 to download data from and/or upload data to one or more data communication networks. This may be via wired and/or wireless communication.

It will be appreciated that the architecture of the system 800 illustrated in FIG. 8 and described above is merely exemplary and that other computer systems 800 with different architectures (for example with fewer components than shown in FIG. 8 or with additional and/or alternative components than shown in FIG. 8) may be used in embodiments of the invention. As examples, the computer system 800 could comprise one or more of: a personal computer; a server computer; a mobile telephone; a tablet; a laptop; a geographical navigation device; a television set; a set top box; a games console; other mobile devices or consumer electronics devices; etc. Additionally, it is possible that some components of the computer system 800 are not located in the computer 802 and are, instead, part of a computer network connected to the computer 802 via the network interface 816. Additionally or alternatively, the computer system 800 may comprise multiple computers 802, for example in a network of computers such as a cloud system of computing resources.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flow-charts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of generating an indication of where, within a geographical region, a mobile unit can move to from a specified origin in the geographical region using a network of navigable elements in the geographical region and in accordance with a total movement budget specified for the mobile unit, the method comprising:

receiving at a navigation system an indication request transmitted by a client device, the indication request including origin data of the mobile unit;

for each sub-region of a set of one or more sub-regions of the geographical region, associating one or more corresponding utilization amounts with said sub-region;

identifying an initial navigable element that corresponds to the origin;

performing a sequence of steps, wherein each step includes:

using an identification function to identify an additional navigable element, wherein the additional navigable element is a neighbour of an already-identified navigable element and can be reached by the mobile unit from the origin in accordance with the total movement budget; and in response to the identification function identifying an additional navigable element of at least one sub-region, performing an update for at least one utilization amount corresponding to a sub-region for the identified additional navigable element;

wherein, for each sub-region of the set of one or more sub-regions, the identification function is arranged to ignore at least one of the unidentified navigable elements of that sub-region if a group comprising the one or more utilization amounts that correspond to that sub-region and that have passed a corresponding predetermined threshold meets an ignore criterion;

generating, via the navigation system, the indication of where the mobile unit can move to according to the navigable elements that have been identified; and transmitting the indication to a client device to direct or control movement of the mobile unit according to the indication.

2. The method of claim 1, wherein the identification function and/or the update is based, at least in part, on a classification, from a predetermined set of classifications, associated with the identified additional navigable element, wherein the classifications in the predetermined set of classifications are ranked such that a first navigable element having a higher ranked classification than a second navigable element is indicative of the first navigable element being more likely than the second navigable element to be: (a) used for route planning; and/or (b) of importance or utility for transit through the geographical region.

3. The method of claim 2, wherein performing said update for a utilization amount includes adjusting said utilization amount in accordance with an amount having a magnitude that is dependent on the classification of the identified additional navigable element, wherein, optionally, the magnitude for the adjustment that is dependent on the classification of the identified additional navigable element changes monotonically according to increasing classification rank.

4. The method of claim 3, wherein for at least one sub-region of the set of one or more sub-regions, the method includes associating a corresponding subset of the predetermined set of classifications with said sub-region, and, for said sub-region, the identification function is arranged to ignore unidentified navigable elements of said sub-region having a classification in the subset.

5. The method of claim 3, wherein, for each sub-region of the set of one or more sub-regions, the one or more corresponding utilization amounts include a utilization amount for at least one classification of the predetermined set of classifications, and wherein performing said update comprises updating the utilization amount that corresponds to the classification of the identified additional navigable element, wherein, optionally, for each sub-region of the set of one or more sub-regions, the at least one of the unidentified navigable elements of that sub-region ignored by the identification function includes navigable elements of a given classification if the corresponding utilization amount for the given classification has passed the corresponding predetermined threshold.

6. The method of claim 2, wherein for at least one sub-region of the set of one or more sub-regions, the method includes associating a corresponding subset of the predetermined set of classifications with said sub-region, and, for said sub-region, the identification function is arranged to ignore unidentified navigable elements of said sub-region having a classification in the subset.

7. The method of claim 6, comprising:

updating the subset corresponding to the sub-region for the identified additional navigable element in response to the identified additional navigable element satisfying an update criterion, wherein, optionally, the update criterion includes the classification rank for the identified additional navigable element being higher than the classification rank of any already-identified navigable elements of the sub-region for the identified additional navigable element.

8. The method of claim 7, comprising, in response to updating the subset corresponding to the sub-region for the identified additional navigable element, for at least one utilization amount corresponding to the sub-region for the identified additional navigable element, setting said utilization amount to a value in a range bounded by a corresponding predetermined initial value for said utilization amount and a current value of said utilization amount.

9. The method of claim 8, where at least one subset comprises one or more classifications of lower rank than the highest classification rank of any already-identified navigable elements of the corresponding sub-region.

10. The method of claim 7, where at least one subset comprises one or more classifications of lower rank than the highest classification rank of any already-identified navigable elements of the corresponding sub-region.

11. The method of claim 2, wherein, for each sub-region of the set of one or more sub-regions, the one or more corresponding utilization amounts include a utilization amount for at least one classification of the predetermined set of classifications, and wherein performing said update comprises updating the utilization amount that corresponds to the classification of the identified additional navigable element, wherein, optionally, for each sub-region of the set of one or more sub-regions, the at least one of the unidentified navigable elements of that sub-region ignored by the identification function includes navigable elements of a given classification if the corresponding utilization amount for the given classification has passed the corresponding predetermined threshold.

12. The method of claim 2, wherein performing said update for a utilization amount includes adjusting said utilization amount in accordance with an amount having a magnitude dependent on a length of the identified additional navigable element, wherein the magnitude dependent on the length of the identified additional navigable element for the adjustment increases monotonically according to increasing length.

13. The method of claim 1, wherein performing said update for a utilization amount includes adjusting said utilization amount in accordance with an amount having a magnitude dependent on a length of the identified additional navigable element, wherein the magnitude dependent on the length of the identified additional navigable element for the adjustment increases monotonically according to increasing length.

14. The method of claim 1, wherein performing said update for a utilization amount includes adjusting said utilization amount in accordance with an amount having a magnitude dependent on the number of sub-regions that contain at least a part of the identified additional navigable element, wherein the magnitude dependent on the number of sub-regions that contain at least a part of the identified additional navigable element increases monotonically according to the number of sub-regions that contain at least a part of the identified additional navigable element, wherein optionally the magnitude dependent on the number of sub-regions that contain at least a part of the identified additional navigable element is a first predetermined value if the number of sub-regions that contain at least a part of the identified additional navigable element is 1, and is a second value greater than the first predetermined value otherwise, wherein, further optionally, the first predetermined value is 0 or 1.

15. The method of claim 1, wherein either:
(a) the identification function is arranged to not ignore any unidentified navigable elements that satisfy one or more predetermined criteria; or
(b) for each sub-region of the set one or more sub-regions, the identification function is arranged to ignore all of the unidentified navigable elements of that sub-region if the group including the one or more utilization amounts that correspond to that sub-region and that have passed the corresponding predetermined threshold meets the ignore criterion.

16. The method of claim 1, wherein the ignore criterion specifies that: (a) the group comprises at least a predetermined number of utilization amounts, wherein, optionally, the predetermined number of utilization amounts is 1; and/or (b) the group comprises one or more specific utilization amounts.

17. The method of claim 1, wherein the total movement budget specified for the mobile unit includes one or more of: (a) an amount of energy or fuel available for moving the mobile unit; (b) an amount of time available for moving the mobile unit; and (c) a maximum distance for moving the mobile unit.

18. The method of claim 1, comprising:
in response to at least a part of the identified additional navigable element not being contained by the set of one or more sub-regions, updating the set of one or more sub-regions by including one or more further sub-regions so that the identified additional navigable element is contained by the set of one or more sub-regions.

19. A system arranged to carry out a method of generating an indication of where, within a geographical region, a mobile unit can move to from a specified origin in the geographical region using a network of navigable elements in the geographical region and in accordance with a total movement budget specified for the mobile unit, the system comprising a navigation system configured to be in communication with a client device;

wherein the method includes:
receiving at the navigation system an indication request transmitted by the client device, the indication request including origin data of the mobile unit;
for each sub-region of a set of one or more sub-regions of the geographical region, associating one or more corresponding utilization amounts with said sub-region;
identifying an initial navigable element that corresponds to the origin;
performing a sequence of steps, wherein each step includes:
using an identification function to identify an additional navigable element, wherein the additional navigable element is a neighbour of an already-identified navigable element and can be reached by the mobile unit from the origin in accordance with the total movement budget; and
in response to the identification function identifying an additional navigable element of at least one sub-region, performing an update for at least one utilization amount corresponding to a sub-region for the identified additional navigable element;
wherein, for each sub-region of the set of one or more sub-regions, the identification function is arranged to ignore at least one of the unidentified navigable elements of that sub-region if a group comprising the one or more utilization amounts that correspond to that sub-region and that have passed a corresponding predetermined threshold meets an ignore criterion; and
generating, via the navigation system, the indication of where the mobile unit can move to according to the navigable elements that have been identified; and
transmitting the indication to a client device to direct or control movement of the mobile unit according to the indication.

20. A non-transitory computer-readable medium storing a computer program which, when executed by one or more processors, causes the one or more processors to carry out a method of generating an indication of where, within a geographical region, a mobile unit can move to from a specified origin in the geographical region using a network of navigable elements in the geographical region and in accordance with a total movement budget specified for the mobile unit, the method comprising:
receiving at the one or more processors an indication request transmitted by a client device, the indication request including origin data of the mobile unit;
for each sub-region of a set of one or more sub-regions of the geographical region, associating one or more corresponding utilization amounts with said sub-region;
identifying an initial navigable element that corresponds to the origin;
performing a sequence of steps, wherein each step includes:
using an identification function to identify an additional navigable element, wherein the additional navigable element is a neighbour of an already-identified navigable element and can be reached by the mobile unit from the origin in accordance with the total movement budget; and
in response to the identification function identifying an additional navigable element of at least one sub-region, performing an update for at least one utilization amount corresponding to a sub-region for the identified additional navigable element;

wherein, for each sub-region of the set of one or more sub-regions, the identification function is arranged to ignore at least one of the unidentified navigable elements of that sub-region if a group comprising the one or more utilization amounts that correspond to that sub-region and that have passed a corresponding predetermined threshold meets an ignore criterion; and generating, via the one or more processors, the indication of where the mobile unit can move to according to the navigable elements that have been identified;

transmitting the indication to a client device to direct or control movement of the mobile unit according to the indication.

* * * * *